United States Patent
Li et al.

(10) Patent No.: US 7,899,263 B2
(45) Date of Patent: Mar. 1, 2011

(54) METHOD AND APPARATUS FOR PROCESSING ANALYTICAL-FORM COMPRESSION NOISE IN IMAGES WITH KNOWN STATISTICS

(75) Inventors: Dunling Li, Rockville, MD (US); Murray H. Loew, Fairfax Station, VA (US)

(73) Assignee: Texas Instruments Incorporated, Dallas, TX (US)

( * ) Notice: Subject to any disclaimer, the term of this patent is extended or adjusted under 35 U.S.C. 154(b) by 1065 days.

(21) Appl. No.: 11/621,889

(22) Filed: Jan. 10, 2007

(65) Prior Publication Data

US 2008/0013847 A1    Jan. 17, 2008

Related U.S. Application Data

(60) Provisional application No. 60/757,820, filed on Jan. 10, 2006.

(51) Int. Cl.
   *G06K 9/36*    (2006.01)
   *G06K 9/46*    (2006.01)

(52) U.S. Cl. .......................................... 382/248; 382/232

(58) Field of Classification Search .................. 382/232, 382/248, 250, 264
See application file for complete search history.

(56) References Cited

U.S. PATENT DOCUMENTS

| | | | | |
|---|---|---|---|---|
| 5,079,621 A | * | 1/1992 | Daly et al. | 348/396.1 |
| 6,252,905 B1 | * | 6/2001 | Pokrinchak et al. | 375/240.14 |
| 6,640,132 B1 | | 10/2003 | Freeman et al. | |
| 7,308,152 B2 | * | 12/2007 | Ito | 382/260 |
| 2006/0034524 A1 | * | 2/2006 | Kitamura | 382/232 |
| 2006/0088098 A1 | * | 4/2006 | Vehvilainen | 375/240.03 |

OTHER PUBLICATIONS

M. Frigo and S. G. Johnson, "The Design and Implementation of FFTW3," Proceedings of the IEEE 93 (2), 216-231 (2005).*

Myers et al. "Aperture optimization for emission imaging: effect of a spatially varying background", J. Opt. Sco. Am. vol. 7, No. 7, 1990, pp. 1279-1293.*

Rolland et al. "Effect of random background inhomogeneity on observer detection performance", J. Opt. Soc. Am. A. 9, 649-658, 1992.*

Dunling Li; Loew, M.H.; "Model-observer based quality measures for decompressed medical images",IEEE International Symposium on Biomedical Imaging: Nano to Macro, 2004, pp. 832-835, vol. 1.*

Li, Dunling; Loew, M.; "Closed-form quality measures for compressed medical images: statistical preliminaries for transform coding", IEEE Proceedings of the 25th Annual International Conference on Engineering in Medicine and Biology Society, 2003, 837-840 vol. 1.*

* cited by examiner

*Primary Examiner* — Samir A. Ahmed
*Assistant Examiner* — Li Liu
(74) *Attorney, Agent, or Firm* — Steven A. Shaw; W. James Brady; Frederick J. Telecky, Jr.

(57) ABSTRACT

Embodiments of the invention provide methods to calculate compression noise statistics of decompressed images in transform coding. They can be used in compressed image quality assessment, compression algorithm optimization, compression noise reduction, and other quantization and compression related applications.

2 Claims, 11 Drawing Sheets

ORIGINAL IMAGE

DCT IMAGE

QUANTIZED DCT IMAGE

DECOMPRESSED IMAGE

METHOD AND APPARATUS FOR PROCESSING ANALYTICAL-FORM COMPRESSION NOISE IN IMAGES WITH KNOWN STATISTICS

CROSS REFERENCE TO RELATED APPLICATION

This application claims priority to U.S. Provisional Patent Application Ser. No. 60/757,820, filed on Jan. 10, 2006 entitled "Analytical-form Compression Noise in Images with Known Statistics." Said application incorporated herein by reference.

BACKGROUND

Embodiments of the invention are directed, in general, to imaging devices and methods, more specifically to estimate compression noise of decompressed images for known statistics.

Modern medicine cannot be envisaged without the aid of digital imaging. Daily, large amounts of images are obtained from two-dimensional (2D), three-dimensional (3D), four-dimensional (4D—time/space), and multidimensional acquisition devices (i.e. X-ray computed tomography (CT), magnetic resonance imaging (MRI), confocal microscopy, ultrasound imaging, single photon emission computed tomography (SPECT) and positron emission tomography (PET)). While CT and MR acquisition devices still represent a big investment, ultrasound equipment is more accessible for home practitioners and will probably become more and more popular. All these digital images need to be efficiently stored, exchanged and processed. Therefore, recently high performance lossless and lossy compression (decompression) algorithms have been developed. Most of these algorithms are based on transform coding (e.g. JPEG is DCT based coding scheme) or subband coding (e.g. JPEG 2000 is wavelet based coding scheme) and have been tuned in terms of speed and quality with respect to compression ratio.

With lossy compression algorithms, compressed images can be exchanged more efficiently, i.e. more data can be available for the same storage capacity, and faster transfer can be achieved via a network channel however, there is compression distortion in decompressed images. Compression noise statistics represent the compression distortion. This patent teach how to estimate compression noise statistics. In medical applications, medical imaging has started to take advantage of digital technology and open the way for advanced medical imaging, tele-radiology, tele-medicine, and even tele-surgery.

Medical images require large amounts of data storage. For example, one digital mammogram with 50 micron resolution and a 12 bit dynamic range requires 25 MB, and there are usually four images for each patient exam. The requirements for large storage space and high transmission bandwidth have become major issues for medical imaging. Diagnostic tele-medicine is revolutionizing the medical imaging industry, which is facing the challenge to provide image compression with not only high quality but also high compression ratio to have cost-effective storage and transmission. Therefore, one crucial research area is to assess the impact of image compression on diagnostic accuracy. The compression noise statistics can be used to estimate the impacts.

Because of advances in miniaturization and cost-reduction in the semiconductor art, certain devices for tele-medicine and other uses have become small enough to be portable or wearable. These compact devices typically comprise sensors for collecting data, a processor for manipulating data, and a graphical display for showing real-time information. An example of portable imaging device is provided by U.S. Pat. No. 6,417,797, issued on Jul. 9, 2002, to Cousins et al. Said patent incorporated by reference.

Similarly, in forensic crime scene investigations and concealed object detection, there is a need to locate, identify and analyze anomalies or patterns in an image-like data set.

There is a need for a more processor efficient method to estimate compression distortion which can provide compressed image quality assessment, compression algorithm optimization, compression noise reduction, and other quantization and compression related applications.

SUMMARY

In light of the foregoing background, embodiments of the invention provide a circuitry and methods for estimating compression distortions analytically in decompressed images. In this application, lumpy background images are used as an example to show how to calculate compression noise statistics.

A method in accordance with an embodiment includes calculating mean vectors, covariance matrices and probability density functions (PDF) of compression noise. It requires define block-based transform, calculate block-based transform coefficients, estimate quantization noise statistics for the coefficients, that is, mean vectors, covariance matrices and PDFs of quantization noise.

Therefore, the system and method of embodiments of the invention solve the problems identified by prior techniques and provide additional advantages.

BRIEF DESCRIPTION OF THE DRAWINGS

Having thus described the invention in general terms, reference will now be made to the accompanying drawings, which are not necessarily drawn to scale.

Figure 1:
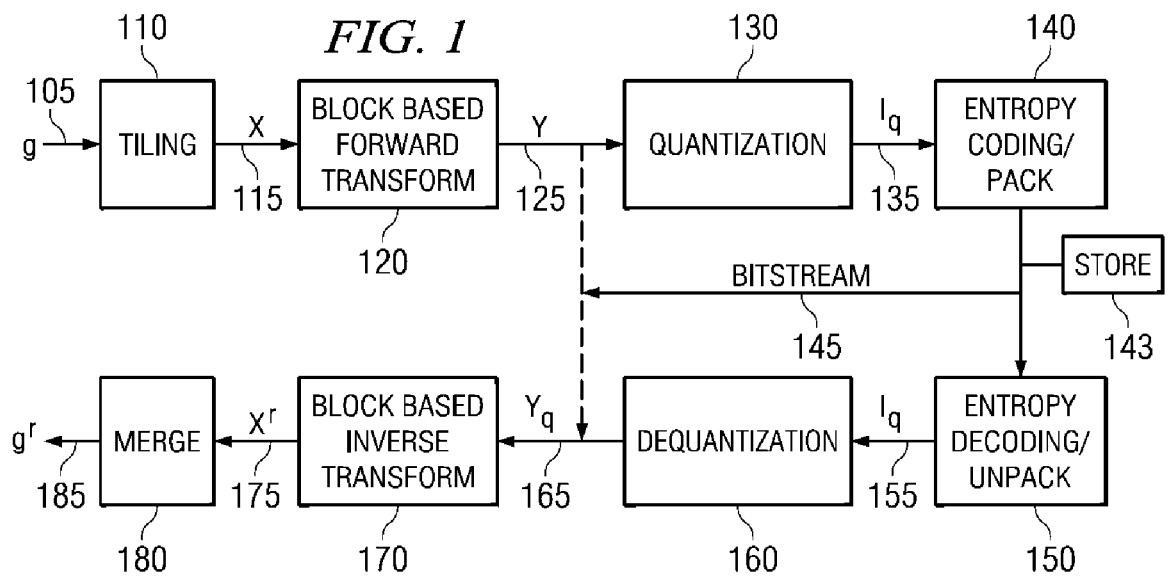

FIG. 1 is a block diagram illustrative of a system for image transform coding.

Figure 2:
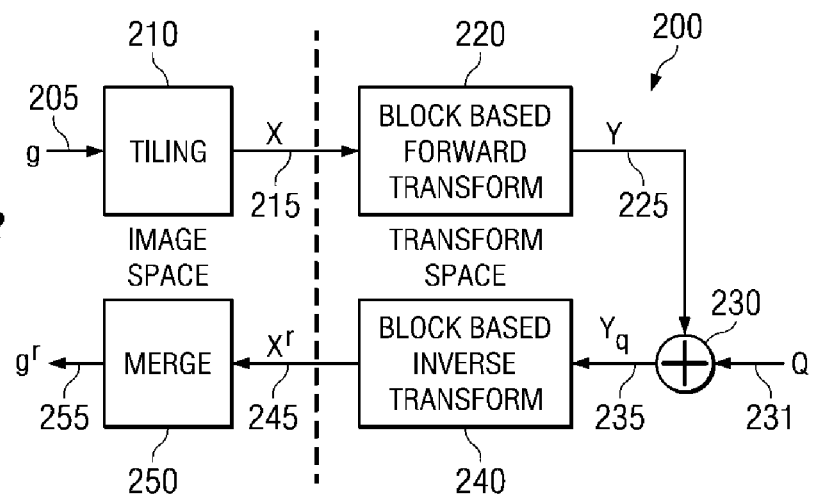

FIG. 2 is a block diagram of a system for image transform coding with additive quantization noise.

Figure 3A:
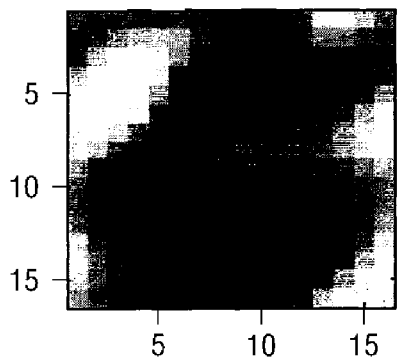
Figure 3B:
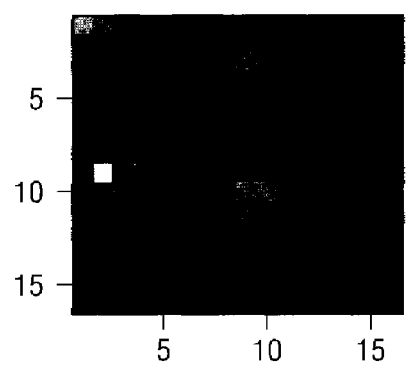
Figure 3C:
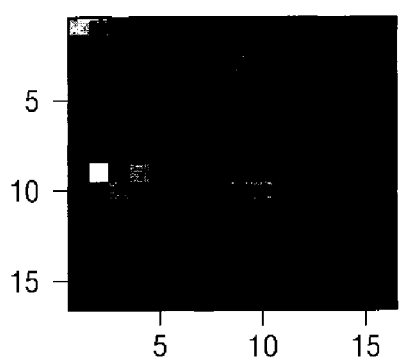

FIG. 3 is a lumpy background image;

FIG. 3A shows the original image;

FIG. 3B shows the DCT image of FIG. 3A;

FIG. 3C shows the quantized DCT image of FIG. 3A; and

Figure 3D:
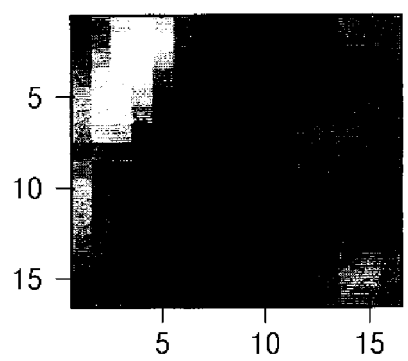

FIG. 3D shows the decompressed image.

Figure 4A:
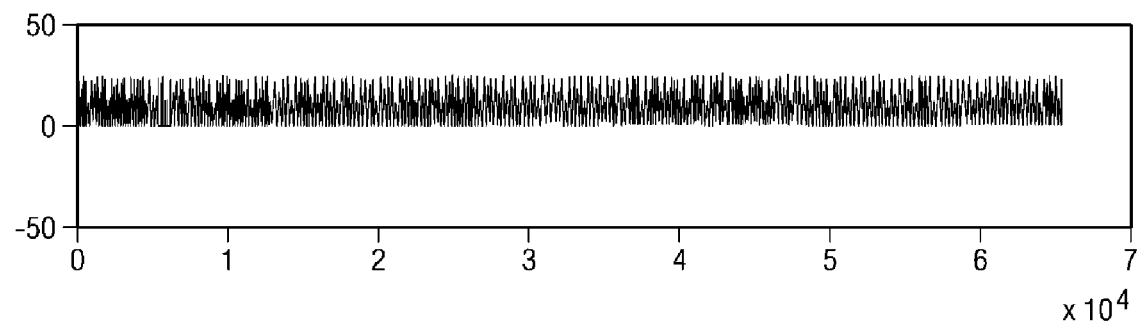
Figure 4B:
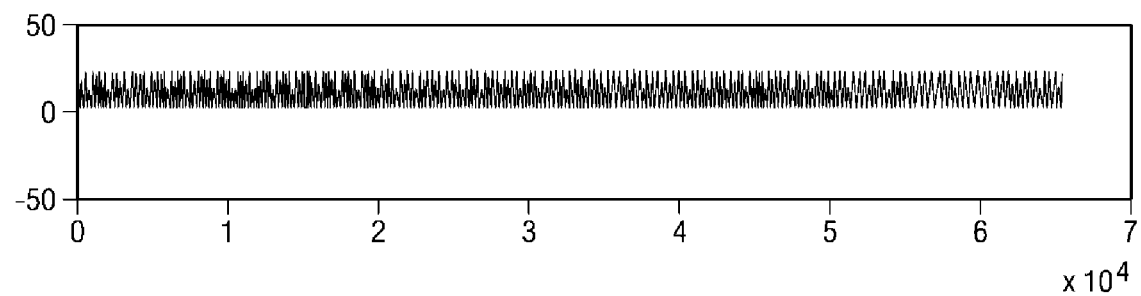

FIG. 4 shows the covariance matrices of lumpy background images;

FIG. 4A shows the estimated covariance matrix of lumpy background images;

FIG. 4B shows the derived covariance matrix of lumpy background images; and

Figure 4C:
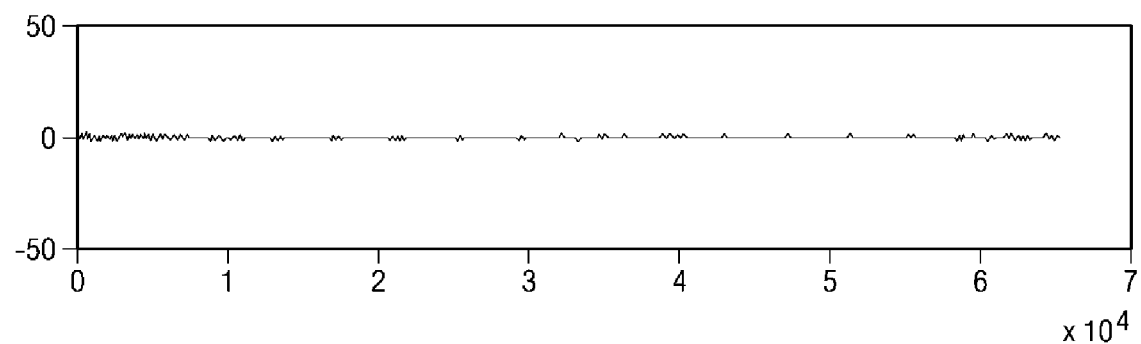

FIG. 4C is the difference image between FIGS. 4A and 4B.

Figure 5A:
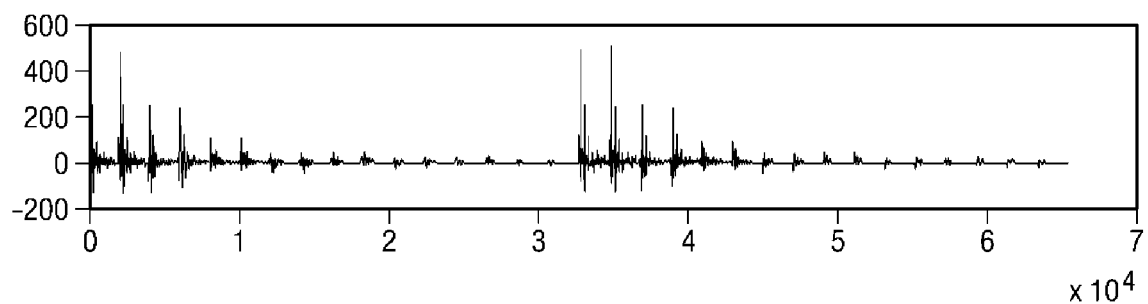
Figure 5B:
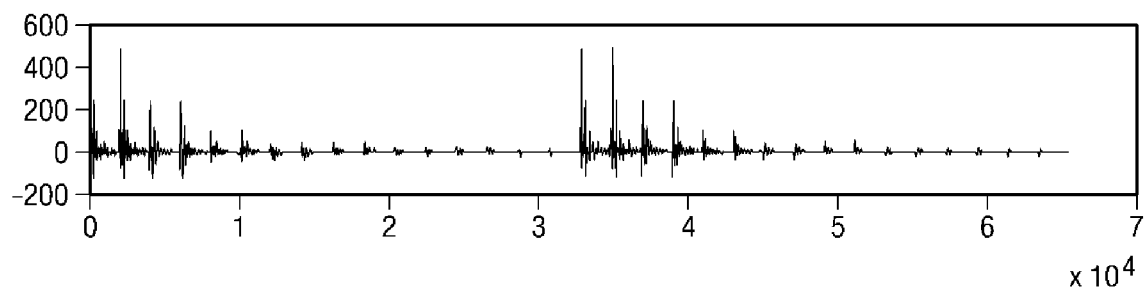

FIG. 5 shows the covariance matrices of DCT coefficients;

FIG. 5A shows the estimated covariance matrix of DCT coefficients;

FIG. 5B shows the derived covariance matrix of DCT coefficients; and

Figure 5C:
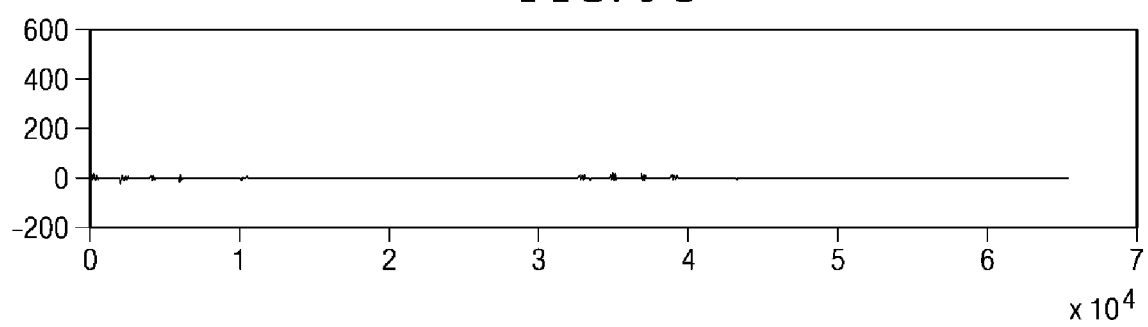

FIG. 5C shows the difference image between matrices of FIG. 5A and FIG. 5B.

Figure 6A:
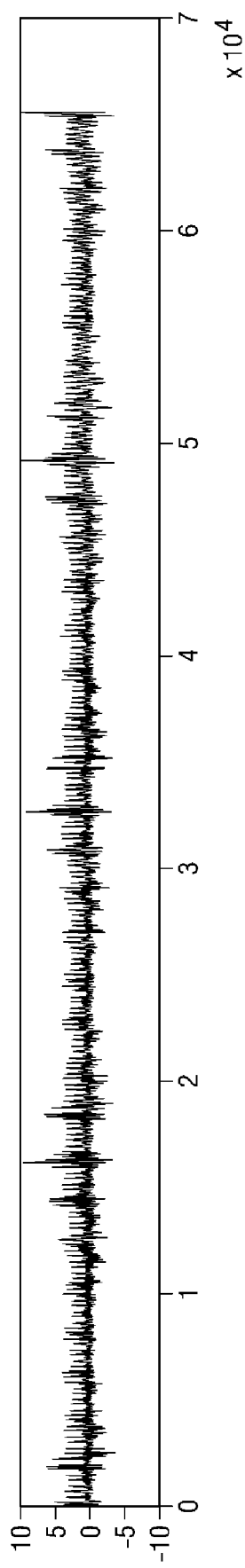
Figure 6B:
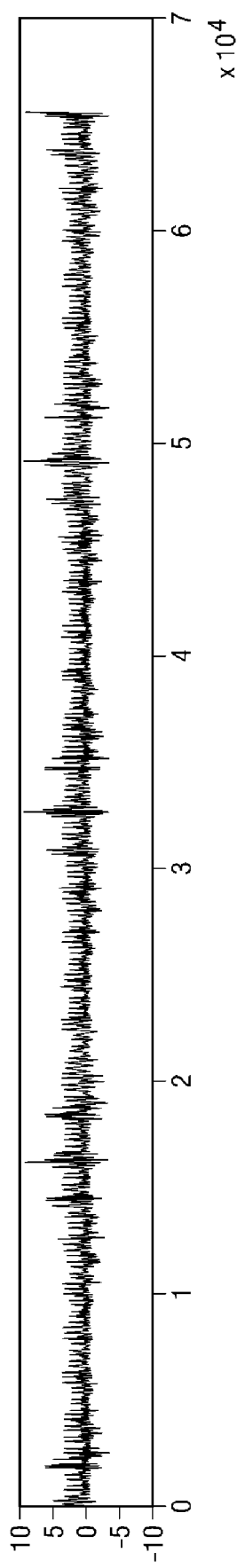

FIG. 6 shows the covariance matrices of quantization noise;

FIG. 6A shows the estimated covariance matrix;

FIG. 6B shows the derived covariance matrix; and

Figure 6C:
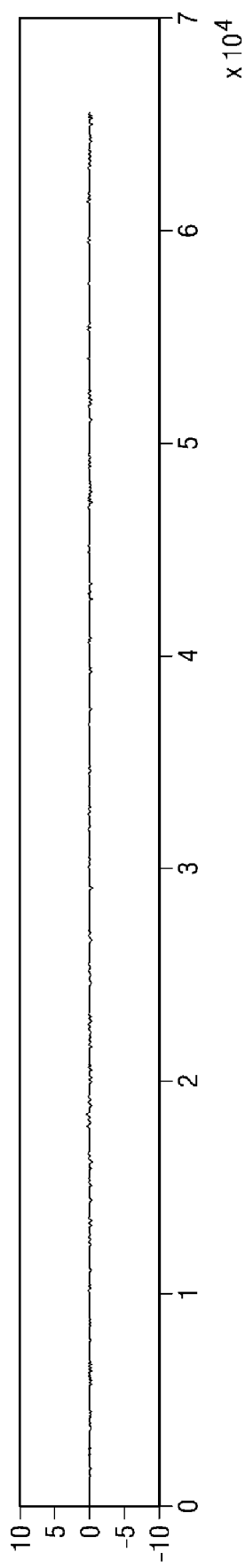

FIG. 6C is the difference between matrices of FIG. 6A and FIG. 6B.

FIG. 7 shows marginal pdfs of quantization noise.

FIG. 8 shows marginal pdfs of compression noise.

FIG. 9 shows the covariance matrix of compression noise.

Figure 10:
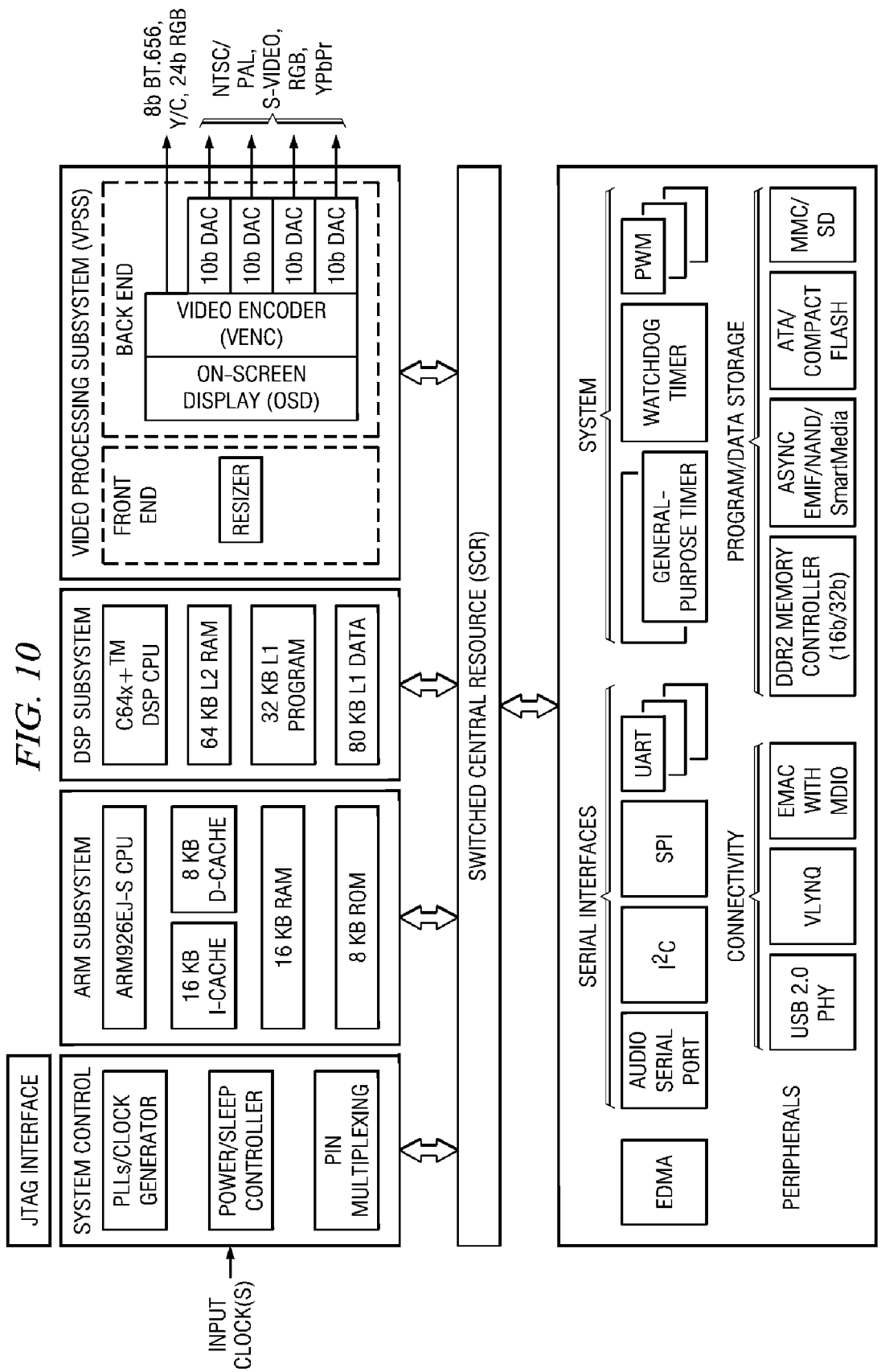

FIG. 10 is a functional block diagram of TMS320DM6443 Digital Media System-on-chip (SOC).

Figure 11:
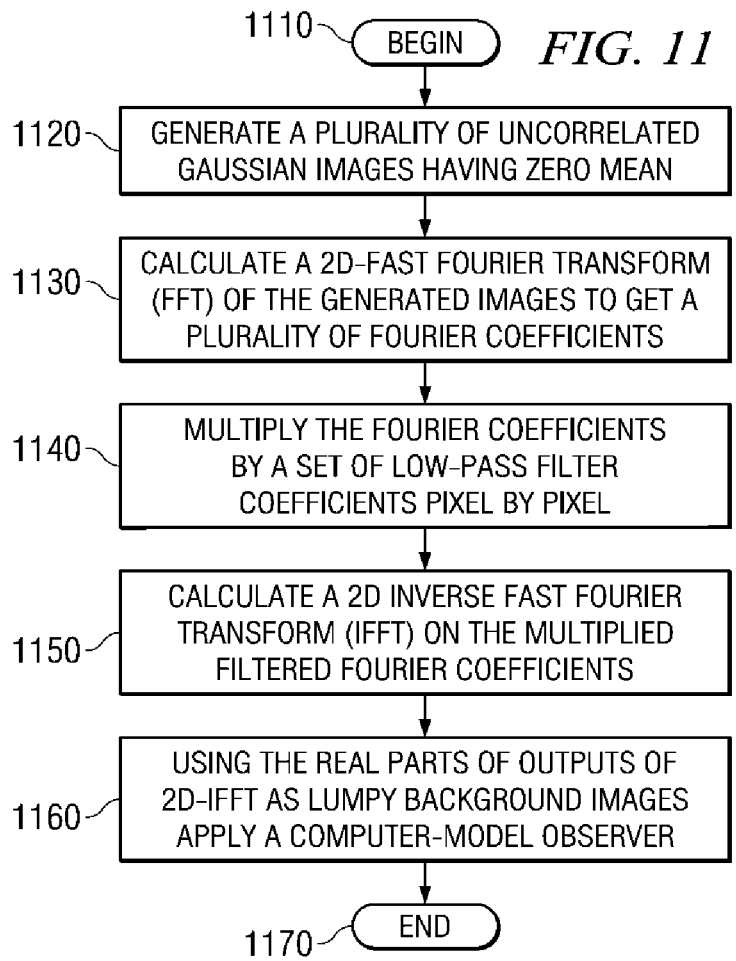

FIG. 11 is a flow chart outlining a method in accordance with an embodiment.

Figure 12:
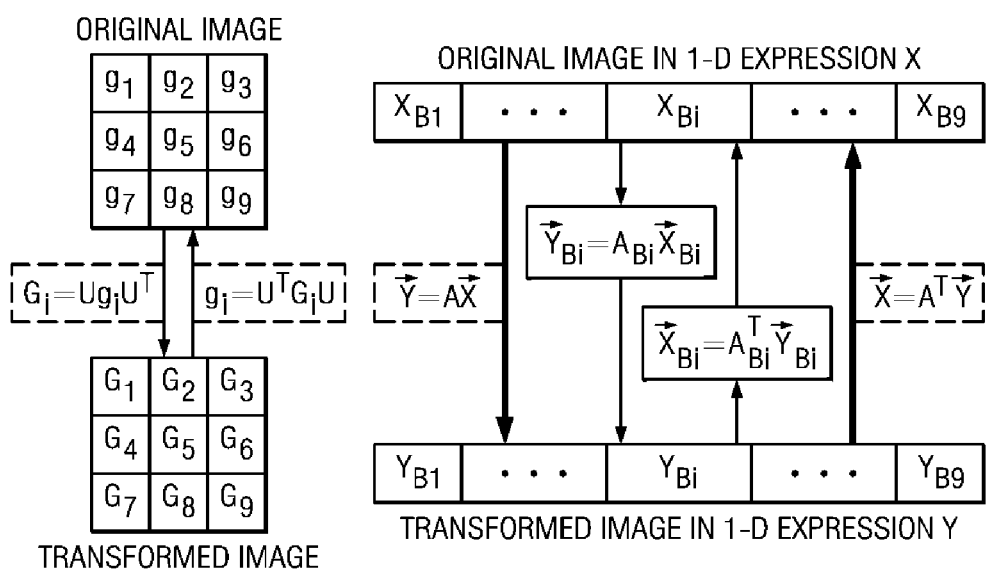

FIG. 12 shows how to arrange image pixels as the input vector of block-based image transform and how to do block-based transform at block and image levels.

Figure 13:
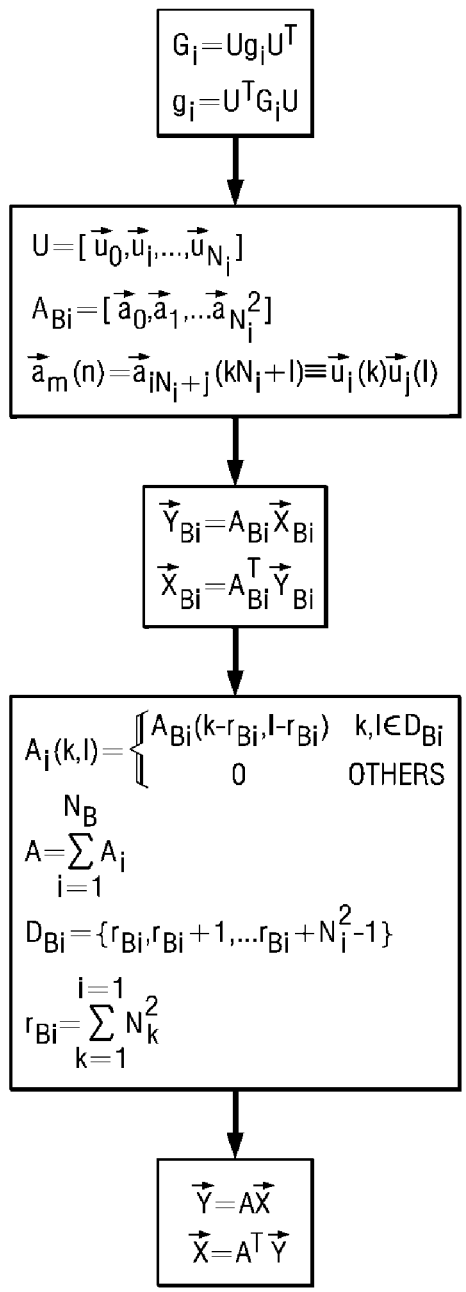

FIG. 13 shows the definition of transform matrices which are used in accordance with embodiments.

Figure 14:
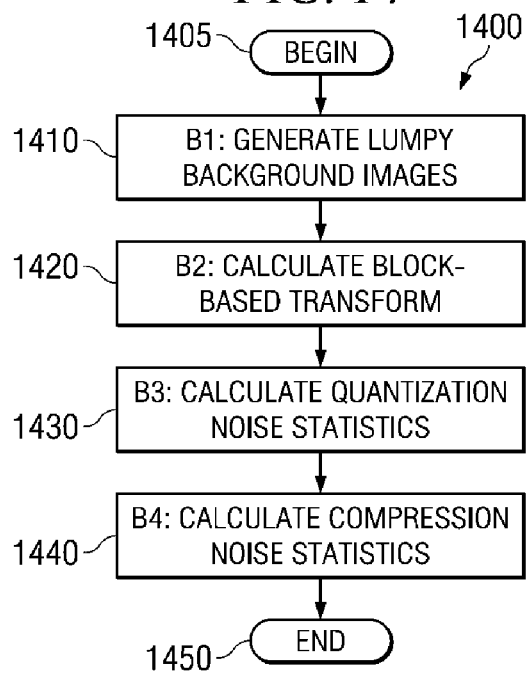

FIG. 14 is a flow chart showing calculating compression noise statistics for lumpy background images.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

Image transform coding, which is widely used in lossy image compression, reduces redundancy by decomposing the source input into components whose individual characteristics allow more efficient representation for each component than the original input. In transform coding, an original image first is divided into non-overlapping blocks, then a linear reversible transform is used to decompose the source input into a set of transformed coefficients. The transformed coefficients are further quantized and coded for transmission or storage. Most of the transforms in transform coding are orthonormal. Among all the transforms, Karhunen-Loeve transform (KLT) provides the largest transform coding gain, but it is not practical due to its computation complexity. Discrete cosine transform (DCT) is the most popular transform in image compression applications because of its implementation simplicity and compaction ability, which is very close to that of KLT for Markov sources with high correlation coefficient. DCT is chosen in many international standards including JPEG, MPEG, and H.261JPEG has already been applied in medical imaging products. However, there is no standard quality measurement in medical imaging to evaluate effect of compression on radiologists' diagnostic accuracies. The most commonly used measurements of compressed image quality, such as mean square error (MSE) or peak signal to noise ratio (PSNR), are not adequate for medical applications. Medical image quality can better be measured by human performance in visual tasks that are relevant to clinical diagnosis. The standard method of evaluating diagnostic methods is a receiver operating characteristic (ROC) study, which is time consuming and costly because it requires a large number of human observations. This is compounded when the set of parameters changes.

Computer-model observers are algorithms that attempt to predict human visual performance in noisy images and might represent the desired metric of image quality when the diagnostic decision involves a human observer and a visual task. Among all the model observers, ideal observer sets an upper bound to the performance of any observer, including the human, while the channelized Hotelling (CH) observer is one of most efficient and practical algorithms for prediction of human performance. The model observer, however, requires knowledge of the background noise statistics. The ideal observer, for example, requires the knowledge of the probability density function of the background noise, while the CH observer needs the first and second moments of the background noise. It is preferred to derive the compression noise statistics analytically, so that analytical-form model observers can be defined on compressed images.

To study the model observer performances on compressed images, model observer has been used to predict human observer performance on compressed images experimentally for various backgrounds. In analytical-form model observers of compressed images known in the art, it was assumed that the quantizers satisfy Bennett's high-resolution condition; so that the quantization noise is distributed uniformly. W. R. Bennett, "Spectra of quantized signals," *Bell Syst. Tech. J* vol. 27, pp. 446-472, July 1948.

However, due to the nature of transform coefficients and quantization step sizes in transform coding, the quantization noise are highly correlated to quantization input samples and its step sizes. Embodiments of the invention provide a system to derive generalized statistics of multi-dimensional quantization noise, including its marginal pdfs, pair-wise pdfs, joint pdfs, mean vector and covariance matrix. The compression noise statistics are also derived and simplified.

A typical transform image compression system is shown in FIG. 1. To reduce the computational complexity and memory consumption, transform coding usually first divides the original images 105 into non-overlapping small blocks in process known as tiling 110, then, for each block, a linear reversible transform 120 is used to decompose the source input 105 into a set of transformed coefficients 125. The transformed coefficients 125 are further quantized 130 and coded 140 for transmission 145 or storage in random access memory 143.

Embodiments of the invention may be implemented in Application Specific Integrated Circuits (ASIC)s, programmable processors such as Digital Signal Processors (DSP)s.

Referring to B1 1410 in Faxed FIG. 14, which generates Lumpy Background images as shown in FIG. 11. FIG. 11 is the flow chart to generate lumpy background images. The lumpy background images in association with embodiments of the invention are generated by filtering white Gaussian noise. The filtering operation induces pixel to pixel correlations and structures into the resulting images. The lumpy background images are produced by low-pass filtering of white Gaussian noise in the frequency domain by the use of a rotationally symmetric Gaussian low-pass filter to give a power spectrum $$W(f) = W_0 \exp(-4\pi^2 S_b^2 f^2),$$

where $W_0$ is the DC spectral density, $S_b$ is the spatial standard deviation (correlation distance) and f is radial spatial frequency. We chose $S_b=2$ in the simulation. The background amplitude variance after filtering is $$\sigma^2 = W_0 4\pi S_b^2.$$

FIG. 3A is a lumpy background image while FIGS. 3B to 3D are its DCT coefficients, quantized DCT coefficients and reconstructed image respectively. Quantization noise is the difference between FIGS. 3B and 3C while compression noise is the difference between FIG. 3A and FIG. 3D. FIG. 4 shows how close the calculate covariance matrix using this patent approach to the actual covariance matrix. In order to generate images that simulated real medical image structures, Rolland and Barrett developed a method known as lumpy background that involves creating Gaussian blobs at different random positions of the image. Such computer-simulated backgrounds that visually appear similar to the real image backgrounds are widely used in medical image quality assessments due to its mathematical tractability and simplicity.

Lumpy background images are generated by low-pass filtering uncorrelated Gaussian noise. These blobs give the image a structured look similar to nuclear-medicine images. Lumpy backgrounds may be generated by filtering uncorrelated Gaussian images.

Referring to FIG. 11, the method of applying a computer model observer starts at 1110. At 1120, generate uncorrelated Gaussian images with zero mean; then calculate 2D-FFT of the generated images 1130. At 1140, multiply the Fourier coefficients by low-pass filter coefficients pixel by pixel. Finally, calculate 2D inverse Fourier transform (2D-IFFT) on filtered Fourier coefficients 1150 and take the real parts of outputs of 2D-IFFT as lumpy background images then apply the computer model observer 1160.

The lumpy background can be expressed in the following mathematical form:

$$\vec{X} = \sqrt{p} Re(F^{-1}WF\vec{N})$$

where p is the power level of uncorrelated Gaussian noise. F and $F^{-1}$ are forward and inverse Fourier transform matrix in 1D presentation; and W is a diagonal matrix whose diagonal elements are filter coefficients. $\vec{N}$ is the uncorrelated Gaussian noise images with zero means and unit covariance matrix. $\vec{X}$ is lumpy background images. We can show that $\vec{X}$ is jointly Gaussian distributed. Its mean is zero, and its covariance matrix is $$Cov(\vec{X}) = p Re(F^{-1}WF) Re(F^{-1}WF)^T.$$

The transformed coefficients $\vec{Y}$ of lumpy background images are $$\vec{Y} = A\vec{X} = \sqrt{p} A Re(F^{-1}WF\vec{N}),$$

where $\vec{X}$ is jointly Gaussian distributed and $\vec{Y}$ is linear transform of $\vec{X}$, transformed image $\vec{Y}$ is jointly Gaussian distributed too. The mean vector of transform images is $$\vec{m}_y = A\vec{m}_x = \vec{0};$$

and its covariance matrix is $$Cov(\vec{Y}) = A Cov(\vec{X}) A^T = p A Re(F^{-1}WF) Re(F^{-1}WF)^T A^T.$$

Referring again to FIG. 1, since unpacking/entropy decoding 150 generates exactly the same quantization index $I_q$ 155 as the input 135 of entropy coding/packing processes 140, the compression distortion comes from quantization 130 and de-quantization 160 alone. A block-based 2-D transform as a 1-D transform, whose transform matrix is a function of transform matrix of each block is used. FIG. 14 shows the flow chart of the calculation of compression noise statistics for lumpy background images. FIG. 5 show how close the covariance matrix (FIG. 5B) which is calculated using this approach to the actual covariance matrix 5A for block-based transform coefficients. The follows are the detail descriptions of the B2 1420 of FIG. 14 calculation. Practically, a 2-D transform performs a 1-D row transform followed by a 1-D column transform as the following transform pair:

$$G_{Bi} = U g_{Bi} U^T \quad (1)$$

and $$g_{Bi} = V G_{Bi} V^T, \quad (2)$$

where $g_{Bi}$ is a B×B 2-D matrix of the ith block pixels, and $G_{Bi}$ is the transformed coefficient matrix of $g_i$; U and V are B×B forward and inverse transform matrices respectively. Usually, U is orthonormal in transform coding, i.e., $V = U^{-1} = U^T$. If $g_{Bi}$ and $G_{Bi}$ are put into 1-D vectors $\vec{X}_{Bi}$ and $\vec{Y}_{Bi}$ respectively, then $\vec{X}_{Bi}(k) = g_i(m,n)$ and $\vec{Y}_{Bi}(k) = G_i(m,n)$, where m and n are column and row indexes, $k = mB+n$, $k = \{0, 1, \ldots, B^2-1\}$ and $m,n = \{0, 1, \ldots, B-1\}$. Let transform matrix U be $U = [\vec{u}_0, \vec{u}_1, \ldots, \vec{u}_{B-1}]^T$, where $\vec{u}_m$'s are B×1 transform bases and U is orthonormal, i.e., if i=j, then $\vec{u}_m \cdot \vec{u}_n = 1$; otherwise, $\vec{u}_m \cdot \vec{u}_n = 0$, where $m,n = \{0, 1, \ldots, B-1\}$. Let the outer-product of $\vec{u}_m$ and $\vec{u}_n$ be $u_{mn} = \vec{u}_m \times \vec{u}_n$, then there are $B^2$ different 2-D matrices $u_{mn}$. If we convert 2-D matrix $u_{mn}$ to 1-D vector $\vec{a}_k$, then its lth element is $\vec{a}_k(l) = u_{mn}(o,p)$, where $k = mB+n$, $l = oB+p$; $k, l = \{0, 1, \ldots, B^2-1\}$ and $m, n, o, p = \{0, 1, \ldots, B-1\}$. Let's construct a $B^2 \times B^2$ matrix $A_B = [\vec{a}_0, \vec{a}_1, \ldots, \vec{a}_{B^2-1}]^T$ using $B^2$ different vectors $\vec{a}_k$, $A_B$ is orthonormal. The 2-D transform pair of the ith block Eq (1) and (2) may be represented in 1-D transform as follows:

$$\vec{Y}_{Bi} = A_B \vec{X}_{Bi} \quad (3)$$

and $$\vec{X}_{Bi} = A_B^T \vec{Y}_{Bi}. \quad (4)$$

If the M×N original image is divided into $N_b$ blocks, then the original and transformed images can be defined as $\vec{X} = [\vec{X}_{B1}^T, \vec{X}_{B2}^T, \ldots, \vec{X}_{BN_b}^T]^T$ and $\vec{Y} = [\vec{Y}_{B1}^T, \vec{Y}_{B2}^T, \ldots, \vec{Y}_{BN_b}^T]^T$ respectively.

The JPEG algorithm is a widely used image compression standard. It uses DCT-based transform coding with uniform partition. Its block size is 8×8. Uniform scalar quantization scheme is used for the quantization of the transform coefficients. A quantization table (QT) is transmitted as part of the encoded bit stream. The same QT will be used in all the blocks. The 8×8 DCT transform matrix of JPEG standard is defined as $U_J = U = [\vec{u}_0, \vec{u}_1, \ldots, \vec{u}_7]^T$ and $$\vec{u}_j(k) = \begin{cases} \sqrt{1/8} & k = 0 \\ \sqrt{2/8} \cos((2k+1)j\pi/(16)) & k \neq 0, \end{cases}$$

where $j, k = \{0, 1, \ldots, 7\}$. Its 1-D transform matrix $A_B = A_{64}$ can be calculated as $$A_{64}(k,l) = A_{64}(8m+n, 8o+p) = \vec{u}_m(n) \vec{u}_o(p),$$

where $k = 8m+n$, $l = 8o+p$; $k, l = \{0, 1, \ldots, 63\}$ and $m, n, o, p = \{0, 1, \ldots, 7\}$. The transform matrix for L×N image is $$A = Diag_{N_b}(A_{64}, A_{64}, \ldots, A_{64}),$$

where $N_b = N_b^{row} N_b^{col}$, $L = 8 N_b^{row}$ and $N = 8 N_b^{col}$. If JPEG 8×8 QT is presented as QT(u, v), then it can be converted to a 1-D scaling vector as $\vec{s}_{64}(m) = \vec{s}_{64}(8u+v) \equiv QT(u,v)$, where $m = 8u+v$, $m = \{0, 1, \ldots, 63\}$ and $u, v = \{0, 1, \ldots, 7\}$. The quantization matrix for each block can be defined as $T_{64} = diag(\vec{s}_{64})$. The quantization matrix of the transformed image is $T = diag_{N_b}(T_{64})$. The quantization indexes are then coded losslessly and there is no saturation error due to bit rate limitation in JPEG.

Derivation of 1-D Block-Based Transform Pair at Image Level

Let 2-D image g and its transform coefficients G map to block-based 1-D vectors $\vec{X}=[\vec{X}_{B1}^T, \vec{X}_{B2}^T, \ldots, \vec{X}_{BN_b}^T]^T$ and $\vec{Y}=[\vec{Y}_{B1}^T, \vec{Y}_{B2}^T, \ldots, \vec{Y}_{BN_b}^T]^T$, $\vec{X}_{Bi}$ and $\vec{Y}_{Bi}$ are $B^2 \times 1$ vectors of the ith B×B block of g and G. Let define tiling operation matrix $W_i$ as $$W_i(k, l) = \begin{cases} I_{B^2}(k - r_{Bi}, l - r_{Bi}) & k, l \in D_{Bi} \\ 0 & \text{otherwise,} \end{cases} \quad (A-1)$$

where $D_{Bi}$ is the set of locations which start at diagonal position $(r_{Bi}, r_{Bi})$ i.e. $D_{Bi}=\{r_{Bi}, r_{Bi}+1, \ldots, r_{Bi}+N_i^2-1\}$ and $r_{Bi}=(i-1)B^2$. Let $\vec{X}_i$ be $N_b B^2 \times 1$ sparse vector in which $\vec{X}_{Bi}$ are non-zero elements at locations $D_{Bi}$, i.e.

$$\vec{X}_i = \begin{cases} \vec{X}_{Bi}(k - r_{Bi}) & k \in D_{Bi} \\ 0 & \text{otherwise.} \end{cases} \quad (A-2)$$

We can show that $$\vec{X}_i = W_i \vec{X} \quad (A-3)$$

as the follows:

$$\left(W_i \vec{X}\right)(k) = \sum_{n=0}^{N^2-1} W_i(k, n)\vec{X}(n) = \sum_{n=r_{Bi}}^{r_{Bi}+N_{Bi}^2-1} W_i(k, n)\vec{X}(n)$$

$$= \begin{cases} \sum_{n=r_{Bi}}^{r_{Bi}+N_{Bi}^2-1} I_{N_i^2}(k, n)\vec{X}(n) & k \in D_{Bi} \\ 0 & \text{otherwise} \end{cases}$$

$$= \begin{cases} \vec{X}(k) & k \in D_{Bi} \\ 0 & \text{otherwise} \end{cases}$$

$$= \begin{cases} \vec{X}_{Bi}(k - r_{Bi}) & k \in D_{Bi} \\ 0 & \text{otherwise.} \end{cases}$$

Similarly, if we define $$\vec{Y}_i(k) = \begin{cases} \vec{Y}_{Bi}(k - r_{Bi}) & k \in D_{Bi} \\ 0 & \text{otherwise,} \end{cases}$$

then we can show $$\vec{Y}_i = W_i \vec{Y} \quad (A-4)$$

If tiling operation Wi and Wj are non-overlap partition, then the following equations are held:

$$\vec{X} = \sum_{i=1}^{N_B} \vec{X}_i \quad (A-5)$$

and $$\vec{Y} = \sum_{i=1}^{N_B} \vec{Y}_i. \quad (A-6)$$

If the block-based transform, an $N^2 \times N^2$ sparse matrix $A_i$ is defined as the ith block transform matrix and $A_{Bi}$ as the non-zeros elements at location $D_{Bi}$ in $A_i$, i.e.

$$A_i(k, l) = \begin{cases} A_{Bi}(k - r_{Bi}, l - r_{Bi}) & k, l \in D_{Bi} \\ 0 & \text{otherwise,} \end{cases} \quad (A-7)$$

Then we can show that $$\vec{Y}_i = A_i \vec{X}_i = A_i \vec{X} \quad (A-8)$$

as follows:

$$\left(A_i \vec{X}\right)(k) = \sum_{l=1}^{N^2-1} A_i(k, l)\vec{X}(l)$$

$$= \sum_{l=r_{Bi}}^{r_{Bi}+N_{Bi}^2-1} A_i(k, l)\vec{X}(l)$$

$$= \sum_{l=r_{Bi}}^{r_{Bi}+N_{Bi}^2-1} A_i(k, l)\vec{X}_{Bi}(l)$$

$$= \begin{cases} \left(A_{Bi}\vec{X}_{Bi}\right)(k - r_{Bi}) & k \in \{r_{Bi}, r_{Bi}+1, \ldots, r_{Bi}+N_{Bi}-1\} \\ 0 & \text{otherwise} \end{cases}$$

$$= \begin{cases} \vec{Y}_{Bi}(k - r_{Bi}) & k \in \{r_{Bi}, r_{Bi}+1, \ldots, r_{Bi}+N_{Bi}-1\} \\ 0 & \text{otherwise} \end{cases}$$

$$= \vec{Y}_i(k).$$

Thus, $$\vec{Y}_i = A_i \vec{X}. \quad (A-9)$$

Also, $$\left(A_i \vec{X}_i\right)(k) = \sum_{l=1}^{N^2-1} A_i(k, l)\vec{X}_i(l) = \sum_{l=r_{Bi}}^{r_{Bi}+N_{Bi}^2-1} A_i(k, l)\vec{X}_{Bi}(l) = \left(A_i \vec{X}\right)(k),$$

therefore, $$\vec{Y}_i = A_i \vec{X}_i = A_i \vec{X}. \quad (A-10)$$

Thus, $$\vec{Y} = \sum_{i=1}^{N_B} \vec{Y}_i = \sum_{i=1}^{N_B} A_i \vec{X} = \left(\sum_{i=1}^{N_B} A_i\right)\vec{X}. \quad (A-11)$$

Let's define $$A = \sum_{i=1}^{N_B} A_i, \quad (A\text{-}12)$$

Then, $$\vec{Y} = A\vec{X} \quad (A\text{-}13)$$

and $$A = \sum_{i=1}^{N_B} A_i = diag(A_{B1}, A_{B2}, \ldots, A_{BN_b}). \quad (A\text{-}14)$$

Similarly we can show that $$\vec{X} = A_T \vec{Y}, \quad (A\text{-}15)$$

thus block-based transform matrix A is orthonormal.

As shown above, the block-based image transform pair may be derived as $$\vec{Y} = A\vec{X} \quad (5)$$

and $$\vec{X} = A_T \vec{Y} \quad (6)$$

where $$A = \sum_{i=1}^{N_b} A_i \quad (7)$$

and $A_i$ is defined as:

$$A_i(k, l) = \begin{cases} A_B(k - r_{Bi}, l - r_{Bi}) & \text{if } k, l \in D_{Bi} \\ 0 & \text{otherwise,} \end{cases} \quad (8)$$

where $k, l = \{0, 1, \ldots, L-1\}$, $L = MN$; L is the total number of pixels in an original image while M and N are the number of pixels in column and row respectively; $i = \{1, 2, \ldots, N_b\}$, $N_b$ is the total number of blocks in the original image $N_b = N_b^{row} N_b^{col}$, $M = BN_b^{row}$ and $N = BN_b^{col}$; The ith block starting at $r_{Bi} = (i-1)B^2$ in $\vec{X}$ and all the indexes of pixels in the ith block are $D_{Bi} = \{r_{Bi}, r_{Bi}+1, \ldots, r_{Bi}+B^2-1\}$. If the row and column numbers of original image are not integer number of B, then one can make the image size as integer of B×B blocks by adding zeros at the end of rows and columns.

Referring to B3 1430 of FIG. 14. Since quantization is the sole distortion source in transform coding, the quantization distortion is considered as additive quantization noise. The transform coding process can be expressed as FIG. 2.

FIG. 2 comprises tiling 210, block-based forward transform 220, block-based inverse transform 240, and merge 250 processes. FIG. 5 shows the comparison of calculated (5B) and actual covariance matrices (5A) of quantization noise they are very close. FIG. 7 shows marginal PDFs of quantization noise for lumpy background images. The detail description for calculating quantization noise statistics are the follows.

FIG. 2 comprises tiling 210, block-based forward transform 220, block-based inverse transform 240, and merge 250 processes.

The quantized transform coefficients vector $$\vec{Y}^q = [(\vec{Y}_{B1}^q)^T, (\vec{Y}_{B2}^q)^T, \ldots, (\vec{Y}_{BN_b}^q)^T]^T \text{ is:}$$

$$\vec{Y}^q = \vec{Y} + \vec{Q} \quad (9)$$

where $\vec{Y} = [\vec{Y}_{B1}^T, \vec{Y}_{B2}^T, \ldots, \vec{Y}_{BN_b}^T]^T$ is the vector of transform coefficients and $\vec{Q} = [\vec{Q}_{B1}^T, \vec{Q}_{B2}^T, \ldots, \vec{Q}_{BN_b}^T]^T$ is the vector of quantization noise. If $\vec{Y}_{Bi}^q$ is quantized $\vec{Y}_{Bi}$, then $$\vec{Y}_{Bi}^q = \vec{Y}_{Bi} + \vec{Q}_{Bi}. \quad (10)$$

where $\vec{Q}_{Bi}$ is the ith block quantization noise vector and $i = \{0, 1, \ldots, N_B - 1\}$. The ith reconstructed image block $\vec{X}_{Bi}^r$ is $$\vec{X}_{Bi}^r = A_{Bi}^T \vec{Y}_{Bi}^q, \quad (11)$$

The decompressed image $\vec{X}^r$ is $$\vec{X}^r = A_T \vec{Y}^q, \quad (12)$$

If the compression noise is defined as the difference between reconstructed and original images, then the ith block compression noise $\vec{R}_{Bi}$ is $$\vec{R}_{Bi} = \vec{X}_{Bi}^r - \vec{X}_{Bi}, \quad (13)$$

and the compression noise $\vec{R}$ at image level can be represented as $$\vec{R} = \vec{X}^r - \vec{X}, \quad (14)$$

where $\vec{X}^r = [(\vec{X}_{B1}^r)^T, (\vec{X}_{B2}^r)^T, \ldots, (\vec{X}_{BN_b}^r)^T]^T$ and $\vec{R} = [\vec{R}_{B1}^T, \vec{R}_{B2}^T, \ldots, \vec{R}_{BN_b}^T]^T$. The compression noise of transform coding is a linear transform of quantization noise at block and image level, i.e.

$$\vec{R}_{Bi} = A_B^T \vec{Q}_{Bi}, \quad (15)$$

and $$\vec{R} = A^T \vec{Q}, \quad (16)$$

where $A_B^T$ is a $B^2 \times B^2$ inverse transform matrix at block level while $A^T$ is a L×L inverse transform matrix at image level and $L = N_b B^2$; $\vec{Q}_{Bi}$ is the ith block quantization noise, while $\vec{Q} = [\vec{Q}_{B1}^T, \vec{Q}_{B2}^T, \ldots, \vec{Q}_{BN_b}^T]^T$ is the quantization noise at image level. The statistics of quantization noise depends on the quantization scheme and the statistics of transform coefficients.

Transform coding performs quantization on transform coefficients and quantization noise is the sole distortion source in transform coding. The statistics of quantization noise depends on quantization scheme and the statistics of transform coefficients. Uniform scalar quantization is a commonly used quantization method in transform coding. If the quantization step size of uniform scalar quantizer is t, then its quantization noise distributes uniformly between −t/2 and t/2 when the input of the quantizer satisfies Bennett's high-resolution condition. However, most of scalar quantizers in transform coding are designed according to the importance of the coefficients in transform space, for example, the step size of JPEG quantization table is based on the emphasis of human eye perception, fine step sizes are used in low spatial frequency components and coarse step sizes are used for high spatial frequency components. In transform coding, not all of the transform coefficients of original images can meet Bennett's high-resolution condition, the quantization noise, therefore, does not distribute uniformly in general. The quantization noise distribution at pixel, block and image level is derived below.

Let transform coefficients and their quantized transform coefficients of the ith block be $\vec{Y}_{Bi}=[y_{i1}, y_{i2}, \ldots, y_{iB^2}]^T$ and $\vec{Y}_{Bi}^q=[y_{i1}^q, y_{i2}^q, \ldots, y_{iB^2}^q]^T$ respectively. Let the ith block quantization noise be $\vec{Q}_{Bi}=[q_{i1}, q_{i2}, \ldots, q_{iB^2}]^T$; Let the ith block quantization matrix, a diagonal matrix of quantization step sizes, be $T_{Bi}=\text{diag}(t_{i1}, t_{i2}, \ldots, t_{iB^2})$, where $i=\{0, 1, 2, \ldots, N_B\}$. The jth quantized coefficients of $\vec{Y}_{Bi}^q$ can be expressed as $$y_{ij}^q = nt_{ij} \text{ if } y_{ij} \in r_{ij,n}, \quad (17)$$

where $y_{ij}$ and $y_{ij}^q$ are the input and output of the scalar quantizer with quantization step size $t_{ij}$: $r_{ij,n}=[t_{ij}(2n-1)/2, t_{ij}(2n+1)/2)$, $n \in [N_{ij,min}, N_{ij,max}]$, $N_{ij,min}=\lceil Y_{ij,min}/t_{ij} \rceil$, $N_{ij,max}=\lceil Y_{ij,max}/t_{ij} \rceil$, $\lceil \cdot \rceil$ is rounding operation, $Y_{ij,min}$ and $Y_{ij,max}$ are the minimum and maximum values of $y_{ij}$ respectively; $i=\{0, 1, 2, \ldots, N_B\}$ and $j=\{0, 1, \ldots, B^2\}$. The jth quantization noise of $\vec{Q}_{Bi}$ can be defined as the difference between the quantizer input and its dequantizer output, i.e.

$$q_{ij} = y_{ij} - y_{ij}^q, \quad (18)$$

where $q_{ij} \in [-t_{ij}/2, t_{ij}/2]$. The pdf of quantization noise is shown as $$p_{q_{ij}}(q_{ij}) = \sum_{n=N_{ij,min}}^{N_{ij,max}} p_n^{q_{ij}}(q_{ij}), \quad (19)$$

where $n = \lceil y_{ij}/t_{ij} \rceil$ and $$p_n^{q_{ij}}(q_{ij}) = \begin{cases} p_{y_{ij}}(q_{ij}+nt_{ij}) & q_{ij} \in [-t_{ij}/2, t_{ij}/2) \\ 0 & \text{otherwise.} \end{cases} \quad (20)$$

The mean and variance of quantization noise $q_{ij}$ are $$\eta_{ij} = \sum_{n=N_{ij,min}}^{N_{ij,max}} \int_{-\frac{t_{ij}}{2}+nq_{ij}}^{\frac{t_{ij}}{2}+nq_{ij}} q_{ij} p_{y_{ij}}(q_{ij}+nt_{ij}) dq_{ij}, \quad (21)$$

and $$\sigma_{ij}^2 = \sum_{n=N_{ij,min}}^{N_{ij,max}} \int_{-\frac{t_{ij}}{2}+nq_{ij}}^{\frac{t_{ij}}{2}+nq_{ij}} (q_{ij}-\eta_{ij})^2 p_{y_{ij}}(q_{ij}+nt_{ij}) dq_{ij} \quad (22)$$

respectively. The joint pdf of the ith block quantization noise is proven as:

$$p_{\vec{Q}_{Bi}}(\vec{Q}_{Bi}) = \sum_{\vec{n} \in D_{\vec{n}}} p_{\vec{n}}(\vec{Q}_{Bi}), \quad (23)$$

where $$p_{\vec{n}}(\vec{Q}_{Bi}) = \begin{cases} p_{\vec{Y}_{Bi}}(\vec{Q}_{Bi}+T_{Bi}\vec{n}) & \vec{Q}_{Bi} \in D_{\vec{Q}_{Bi}} \\ 0 & \text{otherwise,} \end{cases} \quad (24)$$

$$D_{\vec{Q}_{Bi}} = \left\{ \begin{array}{l} \vec{Q}_{Bi}=[q_{i1}, q_{i2}, \ldots, q_{iB^2}]: q_{ij} \in \left[-\frac{t_{ij}}{2}, \frac{t_{ij}}{2}\right], \\ i=1, 2, \ldots, N_B, j=1, 2, \ldots, B^2 \end{array} \right\},$$

$\vec{n}=[n_{i1}, n_{i2}, \ldots, n_{iB^2}]^T$ and $n_{ij} \in [N_{ij,min}, N_{ij,max}]$. Therefore, the joint pdf of the ith block quantization noise can be represented as $$p_{\vec{Q}_{Bi}}(\vec{Q}_{Bi}) = \sum_{\vec{n} \in D_{\vec{n}_{Bi}}} p_{\vec{Y}_{Bi}}(\vec{Q}_{Bi}+T_{Bi}\vec{n}), \quad (25)$$

where $D_{\vec{n}_{Bi}} = \{\vec{n}=[n_{i1}, n_{i2}, \ldots, n_{iB^2}]^T: n_{ij}=\{N_{ij,min}, \ldots, N_{ij,max}\}\}$. The marginal pdf of the jth quantization noise of the ith block is $$p_{\vec{Q}_{Bi}}(q_{ij}) = \int \int_{j \neq i} \int p_{\vec{Q}_{Bi}}(\vec{Q}_{Bi}) dq_1 \ldots dq_j \ldots dq_{B^2} \quad (26)$$

$$= \sum_{n=N_{ij,max}}^{N_{ij,min}} p_{\vec{Y}_{\vec{Q}_{Bi}}}(q_{ij}+nt_{ij}).$$

The joint pair-wise pdf of the jth and the kth quantization noise of the ith block may be derived as $$p_{\vec{Q}_{Bi}}(q_{ij}, q_{ik}) = \int \int \int_{j \neq m, k \neq m} p(\vec{Q}_{Bi}) dq_1 \ldots dq_m \ldots dq_{B^2} \quad (27)$$

$$= \sum_{n_j=N_{ij,min}}^{N_{ij,max}} \sum_{n_k=N_{ik,min}}^{N_{ik,max}} p_{y_{ij},y_{ik}}(q_{ij}+n_j t_{ij}, q_{ik}+n_k t_{ik});$$

Let the mean vector of the ith block quantization noise be $\vec{m}^{\vec{Q}_{Bi}}=[m_1^{\vec{Q}_{Bi}}, m_2^{\vec{Q}_{Bi}}, \ldots, m_{B^2}^{\vec{Q}_{Bi}}]$ and its covariance matrix be $\text{Cov}(\vec{Q}_{Bi})$. Its mean and variance can be derived as $$m_j^{\vec{Q}_{Bi}} = \int_{-\frac{t_{ij}}{2}}^{\frac{t_{ij}}{2}} q_{ij} p_{\vec{Q}_{Bi}}(q_{ij}) dq_{ij} \quad (28)$$

$$= \sum_{n=N_{ij,min}}^{N_{ij,max}} \int_{nt_{ij}-\frac{t_{ij}}{2}}^{nt_{ij}+\frac{t_{ij}}{2}} q_{ij} p_{\vec{Y}_{Bi}}(q_{ij}+n_j t_{ij}) dq_{ij};$$

and $$\text{Cov}(\vec{Q}_{Bi})(j, j) = \sum_{n=N_{ij,min}}^{N_{ij,max}} \int_{-\frac{t_{ij}}{2}}^{\frac{t_{ij}}{2}} \left(q_{ij}-m_j^{\vec{Q}_{Bi}}\right)^2 p_{\vec{Y}_{Bi}}(q_{ij}+nt_{ij}) dq_{ij}. \quad (29)$$

The elements of covariance matrix of quantization noise may be calculated by $$\text{Cov}(\vec{Q}_{Bi})(j,k) = \qquad (30)$$

$$\sum_{n_j=N_{ij,min}}^{N_{ij,max}} \sum_{n_k=N_{ik,min}}^{N_{ik,max}} \int_{-\frac{t_{ij}}{2}}^{\frac{t_{ij}}{2}} \int_{-\frac{t_{ik}}{2}}^{\frac{t_{ik}}{2}} (q_{ij} - m_j^{\vec{Q}_{Bi}})(q_{ik} - m_k^{\vec{Q}_{Bi}})$$

$$p_{y_{ij},y_{ik}}(q_{ij}+n_jt_{ij},q_{ik}+n_kt_{ik})dq_{ij}dq_{ik}.$$

where $i=\{0,1,2,\ldots,N_B\}$ and $j,k=\{0,1,\ldots,B^2\}$. Let the quantization noise at image level be $\vec{Q}=[\vec{Q}_{B1}^T, \vec{Q}_{B2}^T, \ldots, \vec{Q}_{BN_b}^T]^T$, i.e., $\vec{Q}=[q_{11},\ldots,q_{1B^2},\ldots,q_{i1},\ldots,q_{iB^2},\ldots,q_{N_b1},\ldots,q_{N_bB^2}]^T$. Let quantization matrix be $T=\text{diag}(T_{B1}, T_{B2}, \ldots, T_{BN_b})$ at image level, i.e., $T=\text{diag}(t_{11},\ldots,t_{1B^2},\ldots,t_{i1},\ldots,t_{iB^2},\ldots,t_{N_b1},\ldots,t_{N_bB^2})$. Similarly, we can show that the joint pdf of quantization noise is $$p_{\vec{Q}}(\vec{Q}) = \sum_{\vec{n}\in D_{\vec{n}}} p_{\vec{Y}}(\vec{Q}+T\vec{n}), \qquad (31)$$

where $D_{\vec{n}}=\{\vec{n}=[n_{11},\ldots,n_{N_bB^2}]^T: n_{ij}=\{N_{ij,min},\ldots,N_{ij,max}\}, i=\{1,2,\ldots,N_b\}, j=\{1,2,\ldots,B^2\}\}$.

The marginal pdf of the jth quantization noise of the ith block is $$p_{\vec{Q}}(q_{ij}) = p_{\vec{Q}_{B_i}}(q_{ij}). \qquad (32)$$

The joint pair-wise pdf of the jth component of the ith block and the lth component of the kth block may be derived as $$p_{\vec{Q}}(q_{ij}, q_{kl}) = \sum_{n_j=N_{ij,min}}^{N_{ij,max}} \sum_{n_l=N_{kl,min}}^{N_{kl,max}} p_{y_{ij},y_{ik}}(q_{ij}+n_jt_{ij}, q_{ik}+n_lt_{kl}); \qquad (33)$$

Let the mean vector of quantization noise be $\vec{m}^{\vec{Q}}=[m_{11}^{\vec{Q}},\ldots,m_{1B^2}^{\vec{Q}},\ldots,m_{N_b1}^{\vec{Q}},\ldots,m_{N_bB^2}^{\vec{Q}}]$ and its covariance matrix be $\text{Cov}(\vec{Q})$. The mean and variance are $$m_{ij}^{\vec{Q}} = m_j^{\vec{Q}_{B_i}}; \text{ and} \qquad (34)$$

$$\text{Cov}(\vec{Q})((i-1)B^2+j,(i-1)B^2+j) = \text{Cov}(\vec{Q}_{\vec{Q}_{B_i}})(j,j) \qquad (35)$$

respectively. The cross term of quantization noise covariance matrix can be calculated by $$\text{Cov}(\vec{Q})((i-1)B^2+j,(k-1)B^2+l) = \qquad (36)$$

$$\sum_{n_j=N_{ij,min}}^{N_{ij,max}} \sum_{n_l=N_{kl,min}}^{N_{kl,max}} \int_{-\frac{t_{ij}}{2}}^{\frac{t_{ij}}{2}} \int_{-\frac{t_{kl}}{2}}^{\frac{t_{kl}}{2}} (q_{ij} - m_{ij}^{\vec{Q}})(q_{kl} - m_{kl}^{\vec{Q}})$$

$$p_{y_{ij},y_{kl}}(q_{ij}+n_jt_{ij}, q_{kl}+n_lt_{kl})dq_{ij}dq_{kl}.$$

where $i,k=\{0,1,2,\ldots,N_b\}$ and $k,l=\{0,1,\ldots,B^2\}$.

Since the joint pdf of transform coefficients of lumpy background images has a Gaussian distribution as shown in equation (60), using (31) can show that the joint pdf of JPEG quantization noise is $$p_{\vec{Q}}(\vec{Q}) = \frac{1}{(2\pi)^{M/2}\|\text{Cov}(\vec{Y})\|^{1/2}} \sum_{\vec{n}\in D_{\vec{n}}} \exp\left(-\frac{1}{2}(\vec{Q}+T\vec{n})^T \text{Cov}(\vec{Y})^{-1}(\vec{Q}+T\vec{n})\right)$$

where $M=LN$. Its marginal and pair-wise pdfs of JPEG quantization noise of lumpy background are $$p_{\vec{Q}}(q_i) = \frac{1}{\sqrt{2\pi\text{Cov}(\vec{Y})(i,i)}} \sum_{n=N_{i,min}}^{N_{i,max}} \exp\left(-\frac{(q_i+nt_i)^2}{2\text{Cov}(\vec{Y})(i,i)}\right) \qquad (37)$$

And $$p_{\vec{Q}}(q_i,q_j) = \sum_{n_i=N_{min}^i}^{N_{max}^i} \sum_{n_j=N_{min}^j}^{N_{max}^j} \frac{\exp\left(-\frac{1}{2(1-\rho_{i,j}^2)}\left(\frac{(q_i+n_it_i)^2}{\sigma_{y_i}^2} - 2\rho_{i,j}\frac{(q_i+n_it_i)(q_j+n_jt_j)}{\sigma_{y_i}\sigma_{y_j}} + \frac{(q_j+n_jt_j)^2}{\sigma_{y_j}^2}\right)\right)}{2\pi\sigma_{y_i}\sigma_{y_j}\sqrt{1-\rho_{i,j}^2}}$$

respectively. The mean vector and covariance matrix of JPEG quantization noise of lumpy background images are $$\vec{m}(\vec{Q}) = \vec{0}$$

and $$\text{Cov}(\vec{Q})(i,j) = \sum_{k=1}^{M}\sum_{l=1}^{M} A(i,k)A(j,l)$$

$$\sum_{n_k=N_{min}^k}^{N_{max}^k} \sum_{n_l=N_{min}^l}^{N_{max}^l} \int_{-\frac{t_k}{2}}^{\frac{t_k}{2}} \int_{-\frac{t_l}{2}}^{\frac{t_l}{2}} q_k q_l p_{\vec{Y}}(q_k+n_kt_k, q_l+n_lt_l)dq_kdq_l$$

where $i,k=\{0,1,2,\ldots,N_b\}$ and $k,l=\{0,1,\ldots,B^2\}$.

Referring to FIG. 14 B4 1140, compression noise statistics can be calculated from quantization noise statistics. FIG. 6B shows the covariance matrix of compression noise for lumpy background images; FIG. 6A is the actual estimated one. FIG. 6C shows the differences between 6A and 6B, all of them show the teached method in this patent very effective. FIG. 8 shows marginal PDFs of compression noise for lumpy background images, dot are actual estimated PDFs while solid lines are calculated from this method. The calculation details of compression noise statistics are the follows:

The PDF of Multi-Dimensional Quantization Noise for Uniform Scalar Quantizers.

Let $\vec{x}=[x_1, x_2, \ldots x_M]$ and $\vec{s}=[s_1, s_2, \ldots s_M]$ are input vector and its step size of uniform quantizers. $P(\vec{x})$ is the probability of $\vec{x} \leq \vec{x} < \vec{x}+\Delta\vec{x}$ and $p(\vec{x})$ is the joint pdf of input random vector $\vec{x}$. If the quantization output is $\vec{q}=[q_1, q_2, \ldots q_M]$, then $$q_i(x_i) = s_i[x_i/s_i], \quad (A\text{-}16)$$

where $i=1, 2, \ldots, M$ and $x_i \in [X_{min}^i, X_{max}^i]$. Let $N_{min}^i=[X_{min}^i/s_i]$ and $N_{max}^i=[X_{max}^i/s_i]$. Then, $q_i(x) \in \{-sN_{min}^i \ldots -s, 0, s \ldots sN_{max}^i\}$. The quantization noise can be defined as $\vec{\epsilon} = [\epsilon_1, \epsilon_2, \ldots \epsilon_M]$, where $\epsilon_i=x_i-q_i(x_i)$ and $\epsilon_i \in [-s_i/2, s_i/2]$. The joint probability of quantization noise is $$P_q(\vec{\epsilon} \leq \vec{\epsilon} < \vec{\epsilon}+\Delta\vec{\epsilon}) = \sum_{\vec{n} \in D_{\vec{n}}} P_{\vec{n}}(\vec{\epsilon} \leq \vec{\epsilon} < \vec{\epsilon}+\Delta\vec{\epsilon}), \quad (A\text{-}17)$$

where $D_{\vec{n}}=\{\vec{n}=[n_1, n_2, \ldots, n_M]: n_i \in \{N_{min}^i, \ldots -1, 0, 1, \ldots, N_{max}^i\}, i=1, 2, \ldots, M\}$ and $$P_{\vec{n}}(\vec{\epsilon} \leq \vec{\epsilon} < \vec{\epsilon}+\Delta\vec{\epsilon}) = \begin{cases} P(\vec{x} \leq \vec{x} < \vec{x}+\Delta\vec{x}) & \vec{x} \in D_x \\ 0 & \text{otherwise,} \end{cases} \quad (A\text{-}18)$$

where $$D_x = \left\{ D_{\vec{n}} : x_i \in \left[\frac{(2n_i-1)s_i}{2}, \frac{(2n_i+1)s_i}{2}\right), i \in \{1, 2, \ldots, M\}, \vec{n} \in D_{\vec{n}}\right\}.$$

We can prove the joint pdf is $$p_q(\vec{\epsilon}) = \lim_{\Delta\vec{\epsilon} \to 0} \frac{P_q(\vec{\epsilon} \leq \vec{\epsilon} \leq \vec{\epsilon}+\Delta\vec{\epsilon})}{\sqrt{\Delta\vec{\epsilon}\Delta\vec{\epsilon}^T}}. \quad (A\text{-}19)$$

as follows:

$$p_q(\vec{\epsilon}) = \lim_{\Delta\vec{\epsilon} \to 0} \sum_{\vec{n} \in D_{\vec{n}}} \frac{P_n(\vec{\epsilon} \leq \vec{\epsilon} \leq \vec{\epsilon}+\Delta\vec{\epsilon})}{\sqrt{\Delta\vec{\epsilon}\Delta\vec{\epsilon}^T}}$$

$$= \sum_{\vec{n} \in D_{\vec{n}}} \lim_{\Delta\vec{\epsilon} \to 0} \frac{P_n(\vec{\epsilon}+\vec{n}S \leq \vec{\epsilon} \leq \vec{\epsilon}+\vec{n}S+\Delta\vec{\epsilon})}{\sqrt{\Delta\vec{\epsilon}\Delta\vec{\epsilon}^T}}$$

$$= \sum_{\vec{n} \in D_{\vec{n}}} p_{\vec{n}}(\vec{\epsilon}),$$

where $$p_{\vec{n}}(\vec{\epsilon}) = \begin{cases} p(\vec{\epsilon}+\vec{n}S) & \vec{\epsilon} \in D_{\vec{\epsilon}} \\ 0 & \text{otherwise,} \end{cases} \quad (A\text{-}20)$$

$$\text{and } D_{\vec{\epsilon}} = \left\{ \begin{array}{l} \vec{\epsilon}=[\epsilon_1, \epsilon_2, \ldots, \epsilon_M] : \epsilon_i \in \left[-\frac{s_i}{2}, \frac{s_i}{2}\right], \\ i=1, 2, \ldots, M \end{array} \right\}.$$

The marginal pdf of the ith quantization noise component is $$p_q(\epsilon_i) = \int \int \int_{j \neq i} p(\vec{\epsilon}) d\epsilon_1 \ldots d\epsilon_j \ldots d\epsilon_M \quad (A\text{-}21)$$

$$= \sum_{n=N_{min}^i}^{N_{max}^i} p_{x_i}(\epsilon_i+ns_i).$$

The pair-wise joint pdf of the ith and the jth quantization noise components is $$p_q(\epsilon_i, \epsilon_j) = \int \int \int_{j \neq i, k \neq i} p(\vec{\epsilon}) d\epsilon_1 \ldots d\epsilon_k \ldots d\epsilon_M \quad (A\text{-}22)$$

$$= \sum_{n_i=N_{min}^i}^{N_{max}^i} \sum_{n_j=N_{min}^j}^{N_{max}^j} p_{x_1, x_2}(\epsilon_i+n_i s_i, \epsilon_j+n_j s_j).$$

The mean vector of quantization noise $\vec{m}_\epsilon=[m_1^\epsilon, m_2^\epsilon, \ldots, m_M^\epsilon]$ can be calculated as $$m_i^\epsilon = \int_{-\frac{s_i}{2}}^{\frac{s_i}{2}} \epsilon_i p_q(\epsilon_i) d\epsilon_i = \sum_{n_i=N_{min}^i}^{N_{max}^i} \int_{n_i s_i - \frac{s_i}{2}}^{n_i s_i + \frac{s_i}{2}} (x_i-n_i s_i) p_{x_i}(x_i) dx_i. \quad (A\text{-}23)$$

Derivation from quantization noise to compression noise R=AQ

Let $\vec{Q}_{Bi}$ and $\vec{R}_{Bi}$ be the ith block quantization noise and compression noise vectors respectively. Then $$\vec{Y}_{Bi}^q = \vec{Y}_{Bi} + \vec{Q}_{Bi} \quad (A\text{-}24)$$

and $$\vec{X}_{Bi}^r = \vec{X}_{Bi} + \vec{R}_{Bi}, \quad (A\text{-}25)$$

where $\vec{X}_{Bi}$ and $\vec{Y}_{Bi}$ are the ith block original image and transform coefficients vectors respectively while $\vec{Y}_{Bi}^q$ is quantized $\vec{Y}_{Bi}$ and $\vec{X}_{Bi}^r$ the ith reconstructed image block. Let $A_{Bi}$ be the ith block transform matrix, we can show that $$\vec{R}_{Bi} = A_{Bi}^T \vec{Q}_{Bi} \quad (A\text{-}26)$$

as follows:

$$\vec{R}_{Bi} = \vec{X}_{Bi}^r - \vec{X}_{Bi} = A_{Bi}^T \vec{Y}_{Bi}^q - A_{Bi}^T \vec{Y}_{Bi} = A_{Bi}^T (\vec{Y}_{Bi}^q - \vec{Y}_{Bi}) = A_{Bi}^T \vec{Q}_{Bi}.$$

Now, Let the noise vector be $\vec{Q}=[\vec{Q}_{B1}^T, \vec{Q}_{B2}^T, \ldots, \vec{Q}_{BN_b}^T]^T$, original image and its transform coefficients vectors be $\vec{X}=[\vec{X}_{B1}^T, \vec{X}_{B2}^T, \ldots, \vec{X}_{BN_b}^T]^T$ and $\vec{Y}=[\vec{Y}_{B1}^T, \vec{Y}_{B2}^T, \ldots, \vec{Y}_{BN_b}^T]^T$;

the quantized transform coefficients be $\vec{Y}^q = [(\vec{Y}_{B1}^q)^T, (\vec{Y}_{B2}^q)^T, \ldots, (\vec{Y}_{BN_b}^q)^T]^T$; let $\vec{X}^r = [(\vec{X}_{B1}^r)^T, (\vec{X}_{B2}^r)^T, \ldots, (\vec{X}_{BN_b}^r)^T]^T$ be reconstructed image and $\vec{R} = [\vec{R}_{B1}^T, \vec{R}_{B2}^T, \ldots, \vec{R}_{BN_b}^T]^T$ be compression noise. Then $$\vec{Y}^q = \vec{Y} + \vec{Q} \tag{A-27}$$

and $$\vec{X}^r = \vec{X} + \vec{R}. \tag{A-28}$$

We can show $$\vec{R} = A^T \vec{Q} \tag{A-29}$$

as follows:

$$\vec{R} = [\vec{R}_{B1}^T, \vec{R}_{B2}^T, \ldots, \vec{R}_{BN_b}^T]^T = [A_{B1}^T \vec{Q}_{B1}, A_{B2}^T \vec{Q}_{B2}, \ldots, A_{BN_b}^T \vec{Q}_{BN_b}]^T = \text{diag}(A_{B1}^T, A_{B2}^T, \ldots, A_{BN_b}^T) \vec{Q} = A^T \vec{Q}$$

As compression noise is a linear transform of quantization noise at both block and image levels in transform coding, the mean vector $\vec{m}^{\vec{R}_{Bi}}$ and covariance matrix $\text{Cov}(\vec{R}_{Bi})$ of the ith block compression noise can be shown as:

$$\vec{m}^{\vec{R}_{Bi}} = A_B^T \vec{m}^{\vec{Q}_{Bi}} \tag{38}$$

and $$\text{Cov}(\vec{R}_{Bi}) = A_B^T \text{Cov}(\vec{Q}_{Bi}) A_B, \tag{39}$$

respectively, where $\vec{m}^{\vec{Q}_{Bi}}$ and $\text{Cov}(\vec{Q}_{Bi})$ are the mean vector and covariance matrix of the ith block quantization noise. Similarly, the compression noise mean vector and covariance at image level are $$\vec{m}^{\vec{R}} = A^T \vec{m}^{\vec{Q}} \tag{40}$$

and $$\text{Cov}(\vec{R}) = A^T \text{Cov}(\vec{Q}) A \tag{41}$$

where $\vec{m}^{\vec{Q}}$ and $\text{Cov}(\vec{Q})$ are the mean vector and covariance matrix of quantization noise at image level. So the joint pdf of the ith block compression noise can be described as:

$$P_{\vec{R}_{Bi}}(\vec{R}_{Bi}) = \frac{1}{|A_B|} P_{\vec{Q}_{Bi}}(A_B \vec{R}_{Bi}) = \frac{1}{|A_B|} \sum_{\vec{n} \in D_{\vec{n}_{Bi}}} p_{\vec{Y}}(A_B \vec{R}_{Bi} + T_{Bi} \vec{n}), \tag{42}$$

The marginal pdf of compression noise $r_{ij}$ of the jth component at the ith block can be represented as $$P_{\vec{R}_{Bi}}(r_{ij}) = \int\int\int_{k \neq j} P_{\vec{R}_{Bi}}(\vec{R}_{Bi}) dr_1 \ldots dr_k \ldots dr_{B^2} \tag{43}$$

$$= \frac{1}{|A_B|} \sum_{\vec{n} \in D_{\vec{n}_{Bi}}} \int\int\int_{k \neq j} p_{\vec{Y}}(A_B \vec{R}_{Bi} + T_{Bi} \vec{n}) dr_1 \ldots dr_k \ldots dr_{B^2}$$

The pair-wise pdf of the jth and the kth compression noise of the ith block is $$P_{\vec{R}_{Bi}}(r_{ij}, r_{ik}) = \int\int\int_{l \neq j,k} P_{\vec{R}_{Bi}}(\vec{R}_{Bi}) dr_1 \ldots dr_l \ldots dr_{B^2} \tag{44}$$

$$= \frac{1}{|A_B|} \sum_{\vec{n} \in D_{\vec{n}_{Bi}}} \int\int\int_{l \neq j,k} p_{\vec{Y}}(A_B \vec{R}_{Bi} + T_{Bi} \vec{n}) dr_1 \ldots dr_l \ldots dr_{B^2}.$$

The joint pdf of compression noise at image level is $$P_{\vec{R}}(\vec{R}) = \frac{1}{|A|} P_{\vec{Q}}(A \vec{R}), \tag{45}$$

i.e.

$$P_{\vec{R}}(\vec{R}) = \frac{1}{|A|} \sum_{\vec{n} \in D_{\vec{n}}} p_{\vec{Y}}(A \vec{R} + T \vec{n}), \tag{46}$$

where the joint pdf of quantization noise at image level $P_{\vec{Q}}$ is defined in (31), A is the transform matrix and T is the quantization matrix; $p_{\vec{Y}}(\vec{Y})$ is the joint pdf of the transform coefficients of an original image. The marginal pdf of the jth compression noise $r_{ij}$ of the ith block can be represented as $$P_{\vec{R}}(r_{ij}) = P_{\vec{R}_{Bi}}(r_{ij}). \tag{47}$$

The pair-wise pdf of the jth and the kth compression noise of the ith block is $$P_{\vec{R}}(r_{ij}, r_{ik}) = P_{\vec{R}_{Bi}}(r_{ij}, r_{ij}). \tag{48}$$

and the pair-wise pdf of compression noise for the jth component of the ith block and the lth component of the kth block is $$P_{\vec{R}}(r_{ij}, r_{kl}) = \int\int\int_{(m,n) \neq (i,j),(k,l)} P_{\vec{R}}(\vec{R}) dr_{11} \ldots dr_{mn} \ldots dr_{N_b B^2} \tag{49}$$

$$= \frac{1}{|A|} \sum_{\vec{n} \in D_{\vec{n}}} \int\int\int_{(m,n) \neq (i,j),(k,l)} p_{\vec{Y}}(A \vec{R} + T \vec{n})$$

$$dr_{11} \ldots dr_{mn} \ldots dr_{N_b B^2}.$$

Therefore, the analytical-form statistics of compression noise are functions of the pdfs of original images, transform matrix and quantization matrix. The computation of those statistics involves multi-dimensional integration and summation on joint pdf of original images. Since there are correlations among pixels in original image in general, the joint pdf of original images cannot be represented as a product of pdfs of individual pixels. The multi-dimensional integration and summation of equations (42), (43), (45) and (48) cannot be further simplified analytically. Because the number of pixels is rather large in an image, it is difficult to find compression noise statistics numerically from above equations. Therefore, the pdfs of compression noise need to be simplified in order to make the analytical-form statistics computationally feasible.

From the perspective of compression noise construction, each component of compression noise is a linear combination of a set of quantization noise, i.e., $$r_{ij} = \sum_{k=1}^{B^2} A_B(j,k) q_{ik} \tag{50}$$

where $r_{ij}$ is the compression noise for the jth component at the ith block, $q_{jk}$ is the quantization noise for the kth component at the ith block; $A_B$ is the block transform matrix in transform coding. If human perception based scalar quantizers are used in the quantization of transform coefficients, the components of quantization noise come from different quantizers. Therefore, it can assume that majority of quantization noise components are independent from one to another though the transform coefficients may be correlated. The validity of this assumption may be verified in covariance matrix of lumpy background quantization noise. According to central limit theory, the distribution of each compression noise component approaches normal as the number of quantization noise components increases. Using as few as five components will yield an acceptable approximation to the normal distribution if the pdfs of the individual random variables are identical and smooth. In transform coding, each compression noise component is a linear combination of quantization noise components in its block, so the number of involved quantization noise components is the number of pixels in each block, which is large. For instance, JPEG uses an 8×8 block, so each compression noise component is a linear combination of 64 individual components of quantization noise.

Thus, the marginal pdf of compression noise can be simplified as $$p_{\vec{R}_{Bi}}(r_{ij}) = \frac{1}{\sqrt{2\pi \text{Cov}(\vec{R}_{Bi})(j,j)}} \exp - \frac{\left(r_{ij} - m_{ij}^{\vec{R}_{Bi}}\right)^2}{2\text{Cov}(\vec{R}_{Bi})(j,j)}. \tag{51}$$

To simplify the joint pdf of compression noise, we assume that compression noise is jointly normal, as it is marginally normal. Its pair-wise pdf is $$p_{\vec{R}_{Bi}}(r_{ij}, r_{ik}) = \frac{1}{2\pi\sqrt{\|C_{jk}^{Bi}\|}} \exp - \frac{1}{2} \left[ r_{ij} - m_{ij}^{\vec{R}_{Bi}} \quad r_{ik} - m_{ik}^{\vec{R}_{Bi}} \right] (C_{jk}^{Bi})^{-1} \begin{bmatrix} r_{ij} - m_{ij}^{\vec{R}_{Bi}} \\ r_{kl} - m_{kl}^{\vec{R}_{Bi}} \end{bmatrix}, \tag{52}$$

where $$C_{jk}^{Bi} = \begin{bmatrix} \text{Cov}(\vec{R}_{Bi})(j,j) & \text{Cov}(\vec{R}_{Bi})(j,k) \\ \text{Cov}(\vec{R}_{Bi})(k,j) & \text{Cov}(\vec{R}_{Bi})(k,k) \end{bmatrix}. \tag{53}$$

The joint pdf of the ith block compression noise is $$p_{\vec{R}_{Bi}}(\vec{R}_{Bi}) = \frac{1}{(2\pi)^{B^2/2}\sqrt{\text{Cov}(\vec{R}_{Bi})}} \exp - \frac{1}{2}\left(\vec{R}_{Bi} - \vec{m}^{\vec{R}_{Bi}}\right)^T \text{Cov}(\vec{R}_{Bi}) \left(\vec{R}_{Bi} - \vec{m}^{\vec{R}_{Bi}}\right). \tag{54}$$

The joint pdf of compression noise at image level is $$p_{\vec{R}}(\vec{R}) = \frac{1}{(2\pi)^{N_b B^2/2}\sqrt{\text{Cov}(\vec{R})}} \exp - \frac{1}{2}\left(\vec{R} - \vec{m}^R\right)^T \text{Cov}(\vec{R}) \left(\vec{R} - \vec{m}^{\vec{R}}\right). \tag{55}$$

In order to generate images that simulated real medical image structures, Rolland and Barrett developed a method known as lumpy background that involves creating Gaussian blobs at different random positions of the image. Such computer-simulated backgrounds that visually appear similar to the real image backgrounds are widely used in medical image quality assessments due to its mathematical tractability and simplicity.

Lumpy background images are generated by low-pass filtering uncorrelated Gaussian noise. These blobs give the image a structured look similar to nuclear-medicine images. Lumpy backgrounds may be generated by filtering uncorrelated Gaussian images.

Referring to FIG. 11, the method of applying a computer model observer starts at 1110. At 1120, generate uncorrelated Gaussian images with zero mean; then calculate 2D-FFT of the generated images 1130. At 1140, multiply the Fourier coefficients by low-pass filter coefficients pixel by pixel. Finally, calculate 2D inverse Fourier transform (2D-IFFT) on filtered Fourier coefficients 1150 and take the real parts of outputs of 2D-IFFT as lumpy background images then apply the computer model observer 1160.

The lumpy background can be expressed in the following mathematical form:

$$\vec{X} = \sqrt{p} = Re(F^{-1} W F \vec{N}) \tag{56}$$

where p is the power level of uncorrelated Gaussian noise. F and $F^{-1}$ are forward and inverse Fourier transform matrix in 1D presentation; and W is a diagonal matrix whose diagonal elements are filter coefficients. $\vec{N}$ is the uncorrelated Gaussian noise images with zero means and unit covariance matrix. $\vec{X}$ is lumpy background images. We can show that $\vec{X}$ is jointly Gaussian distributed. Its mean is zero, and its covariance matrix is $$\text{Cov}(\vec{X}) = p Re(F^{-1}WF) Re(F^{-1}WF)^T. \tag{57}$$

The transformed coefficients $\vec{Y}$ of lumpy background images are $$\vec{Y} = A\vec{X} = \sqrt{p} A Re(F^{-1}WF\vec{N}),$$

where $\vec{X}$ is jointly Gaussian distributed and $\vec{Y}$ is linear transform of $\vec{X}$, transformed image $\vec{Y}$ is jointly Gaussian distributed too. The mean vector of transform images is $$\vec{m}_y = A\vec{m}_x = \vec{0}; \tag{59}$$

and its covariance matrix is $$\text{Cov}(\vec{Y}) = A\text{Cov}(\vec{X})A^T = pA\text{Re}(F^{-1}WF)\text{Re}(F^{-1}WF)^T A^T. \tag{60}$$

The joint pdf of transformed images is $$P_{\vec{Y}}(\vec{Y}) = \frac{\exp\left(-\frac{1}{2}\vec{Y}^T \text{Cov}(\vec{Y})^{-1}\vec{Y}\right)}{(2\pi)^{MN/2}|\text{Cov}(\vec{Y})|^{1/2}}, \tag{61}$$

where the size of lumpy background image is M×N. The marginal pdf of the ith transform coefficient is $$P_{\vec{Y}}(y_i) = \frac{1}{\sqrt{2\pi\sigma_{y_i}^2}} \exp\left(-\frac{y_i^2}{2\sigma_{y_i}^2}\right), \tag{62}$$

where $\sigma_{y_i}^2 = \text{Cov}(\vec{Y})(i,i)$. Its pair-wise joint pdf is $$P_{\vec{Y}}(y_i, y_j) = \frac{1}{2\pi\sigma_{y_i}\sigma_{y_j}\sqrt{1-\rho_{i,j}^2}} \tag{63}$$
$$\exp\left(-\frac{1}{2(1-\rho_{i,j}^2)}\left(\frac{y_i^2}{\sigma_{y_i}^2} - 2\rho_{i,j}\frac{y_i y_j}{\sigma_{y_i}\sigma_{y_j}} + \frac{y_j^2}{\sigma_{y_j}^2}\right)\right),$$

where $$\rho_{i,j}^2 = \frac{\left(\text{Cov}(\vec{Y})(i,j)\right)^2}{\text{Cov}(\vec{Y})(i,i)\text{Cov}(\vec{Y})(j,j)}. \tag{64}$$

The JPEG algorithm is a widely used image compression standard. It uses DCT-based transform coding with uniform partition. Its block size is 8×8. Uniform scalar quantization scheme is used for the quantization of the transform coefficients. A quantization table (QT) is transmitted as part of the encoded bit stream. The same QT will be used in all the blocks. The 8×8 DCT transform matrix of JPEG standard is defined as $U_i = U = [\vec{u}_0, \vec{u}_1, \ldots, \vec{u}_7]^T$ and $$\vec{u}_j(k) = \begin{cases} \sqrt{1/8} & k=0 \\ \sqrt{2/8}\cos((2k+1)j\pi/(16)) & k \neq 0, \end{cases} \tag{65}$$

where $j, k = \{0, 1, \ldots, 7\}$. Its 1-D transform matrix $A_B = A_{64}$ can be calculated as $$A_{64}(k,l) = A_{64}(8m+n, 8o+p) = \vec{u}_m(n)\vec{u}_o(p), \tag{66}$$

where $k = 8m+n$, $l = 8o+p$; $k, l = \{0, 1, \ldots, 63\}$ and $m, n, o, p = \{0, 1, \ldots, 7\}$. The transform matrix for L×N image is $$A = \text{Diag}_{N_b}(A_{64}, A_{64}, \ldots, A_{64}), \tag{67}$$

where $N_b = N_b^{row} N_b^{col}$, $L = 8N_b^{row}$ and $N = 8N_b^{col}$. If JPEG 8×8 QT is presented as QT(u,v), then it can be converted to a 1-D scaling vector as $\vec{s}_{64}(m) = \vec{s}_{64}(8u+v) \equiv QT(u,v)$, where $m = 8u+v$, $m = \{0, 1, \ldots, 63\}$ and $u, v = \{0, 1, \ldots, 7\}$. The quantization matrix for each block can be defined as $T_{64} = \text{diag}(\vec{S}_{64})$. The quantization matrix of the transformed image is $T = \text{diag}_{N_b}(T_{64})$. The quantization indexes are then coded losslessly and there is no saturation error due to bit rate limitation in JPEG. Since the joint pdf of transform coefficients of lumpy background images has a Gaussian distribution as shown in equation (60), using (31) can show that the joint pdf of JPEG quantization noise is $$p_{\vec{Q}}(\vec{Q}) = \frac{1}{(2\pi)^{M/2}\|\text{Cov}(\vec{Y})\|^{1/2}} \tag{68}$$
$$\sum_{\vec{n} \in D_{\vec{n}}} \exp\left(-\frac{1}{2}(\vec{Q} + T\vec{n})^T \text{Cov}(\vec{Y})^{-1}(\vec{Q} + T\vec{n})\right)$$

where M=LN. Its marginal and pair-wise pdfs of JPEG quantization noise of lumpy background are $$p_{\vec{Q}}(q_i) = \frac{1}{\sqrt{2\pi\text{Cov}(\vec{Y})(i,i)}} \sum_{n=N_{i,min}}^{N_{i,max}} \exp\left(-\frac{(q_i + nt_i)^2}{2\text{Cov}(\vec{Y})(i,i)}\right) \tag{69}$$

And $$p_{\vec{Q}}(q_i, q_j) = \sum_{n_i=N_{min}^i}^{N_{max}^i}\sum_{n_j=N_{min}^j}^{N_{max}^j} \frac{\exp\left(-\frac{1}{2(1-\rho_{i,j}^2)}\left(\frac{(q_i+n_i t_i)^2}{\sigma_{y_i}^2} - 2\rho_{i,j}\frac{(q_i+n_i t_i)(q_j+n_j t_j)}{\sigma_{y_i}\sigma_{y_j}} + \frac{(q_j+n_j t_j)^2}{\sigma_{y_j}^2}\right)\right)}{2\pi\sigma_{y_i}\sigma_{y_j}\sqrt{1-\rho_{i,j}^2}} \tag{70}$$

respectively. The mean vector and covariance matrix of JPEG quantization noise of lumpy background images are $$\vec{m}(\vec{Q}) = \vec{0} \tag{71}$$

and $$\text{Cov}(\vec{Q})(i,j) = \sum_{k=1}^{M}\sum_{l=1}^{M} A(i,k)A(j,l) \sum_{n_k=N_{min}^k}^{N_{max}^k}\sum_{n_l=N_{min}^l}^{N_{max}^l} \tag{72}$$
$$\int_{-\frac{t_k}{2}}^{\frac{t_k}{2}}\int_{-\frac{t_l}{2}}^{\frac{t_l}{2}} q_k q_l p_{\vec{Y}}(q_k + n_k t_k, q_l + n_l t_l) dq_k dq_l$$

Its joint pdf of JPEG compression noise is $$P_{\vec{R}}(\vec{R}) = \frac{1}{|A|} \sum_{\vec{n} \in D_{\vec{n}}} \frac{\exp\left(-\frac{1}{2}(A\vec{R}+T\vec{n})^T \text{Cov}(\vec{Y})^{-1}(A\vec{R}+T\vec{n})\right)}{(2\pi)^{M/2} |\text{Cov}(\vec{Y})|^{1/2}} \quad (73)$$

Its marginal and pair-wise pdfs are $$P_{\vec{R}}(r_i) = \frac{1}{|A|} \sum_{\vec{n} \in D_{\vec{n}}} \quad (74)$$

$$\int\int\int_{j \neq i} \frac{\exp\left(\begin{array}{c}-\frac{1}{2}(A\vec{R}+T\vec{n})^T \\ \text{Cov}(\vec{Y})^{-1}(A\vec{R}+T\vec{n})\end{array}\right)}{(2\pi)^{M/2} |\text{Cov}(\vec{Y})|^{1/2}} dr_1 \ldots dr_j \ldots dr_M$$

and $$P_{\vec{R}}(r_i, r_j) = \frac{1}{|A|} \sum_{\vec{n} \in D_{\vec{n}}} \quad (75)$$

$$\int\int\int_{j \neq i, j} \frac{\exp\left(\begin{array}{c}-\frac{1}{2}(A\vec{R}+T\vec{n})^T \\ \text{Cov}(\vec{Y})^{-1}(A\vec{R}+T\vec{n})\end{array}\right)}{(2\pi)^{M/2} |\text{Cov}(\vec{Y})|^{1/2}} dr_1 \ldots dr_k \ldots dr_M$$

The simplified marginal pdf, pair-wise pdf and joint pdf of JPEG compression noise are $$P_{\vec{R}}(r_i) = \frac{1}{\sqrt{2\pi \text{Cov}(\vec{R})(i,i)}} \exp\left(-\frac{r_i^2}{2\text{Cov}(\vec{R})(i,i)}\right), \quad (76)$$

$$P_{\vec{R}}(r_i, r_j) = \frac{1}{2\pi\sqrt{\|C_{ij}\|}} \exp\left(-\frac{1}{2}[r_i \; r_j] C_{ij}^{-1} [r_i \; r_j]^T\right), \quad (77)$$

and $$P_{\vec{R}}(\vec{R}) = \frac{1}{(2\pi)^{M/2} \sqrt{\text{Cov}(\vec{R})}} \exp\left(-\frac{1}{2}\vec{R}^T \text{Cov}(\vec{R})\vec{R}\right), \quad (78)$$

where the covariance matrix of JPEG compression is $$\text{Cov}(\vec{R}) = A^T \text{Cov}(\vec{Q})A. \quad (79)$$

To verify the statistics of quantization noise and compression noise derived in this study, lumpy background images are used in the verification tests. The statistics of lumpy background images are shown in equations (58)-(60). To simplify the tests, 2048 images with size 16×16 are used. JPEG compression algorithm is chosen as the transform coding method. To eliminate the precision distortion in computation, images are represented in double floating type and the computations are performed in double precision. Since adding a constant image to lumpy background will not affect covariance matrix, zero mean lumpy background is chosen for simplicity. In covariance matrix verification, the following related mean square error is used to measure the difference between derived matrix $C_1$ and estimated one $C_2$:

$$D_{rmse} = \sqrt{\sum_{i=1}^{M}\sum_{j=1}^{M}(C_1(i,j) - C_2(i,j))^2 \Big/ \sum_{i=1}^{M}\sum_{j=1}^{M} C_2(i,j)^2}, \quad (80)$$

Kolmogorov-Smirnov goodness-of-fit hypothesis tests (K-S tests) were used in pdf verification.

The lumpy background images in association with embodiments of the invention are generated by filtering white Gaussian noise. The filtering operation induces pixel to pixel correlations and structures into the resulting images. The lumpy background images are produced by low-pass filtering of white Gaussian noise in the frequency domain by the use of a rotationally symmetric Gaussian low-pass filter to give a power spectrum $$W(f) = W_0 \exp(-4\pi^2 S_b^2 f^2), \quad (81)$$

where $W_0$ is the DC spectral density, $S_b$ is the spatial standard deviation (correlation distance) and f is radial spatial frequency. We chose $S_b = 2$ in the simulation. The background amplitude variance after filtering is $$\sigma^2 = W_0 4\pi S_b^2. \quad (82)$$

FIG. 3A is a lumpy background image while FIGS. 3B to 3D are its DCT coefficients, quantized DCT coefficients and reconstructed image respectively. Quantization noise is the difference between FIGS. 3B and 3C while compression noise is the difference between FIG. 3A and FIG. 3D. The size of images is 16×16 and the size of their covariance matrices is 256×256. FIG. 4 shows the covariance matrices of lumpy background images. FIG. 4A and FIG. 4B are the estimated and derived covariance matrices of lumpy background images respectively. FIG. 4C is the difference image between FIGS. 4A and 4B. FIG. 4C shows that the differences are very small among all the elements of covariance matrices. Its numerical measure $D_{rmse}$ is 7% in Table 1.

Table 1 also lists $D_{rmse}$ for WGN images which were generated by random noise generation in MATLAB as reference. The $D_{rmse}$ between derived and estimated WGN covariance matrices are about 33% and 11% for 2048 images and 20480 images respectively.

FIG. 5 shows the covariance matrices of DCT coefficients. FIG. 5A and FIG. 5B are the estimated and derived covariance matrices of DCT coefficients respectively.

FIG. 5C is the difference image between FIG. 5A and FIG. 5B. FIG. 5C shows that all the differences between derived and their estimated covariance matrices of DCT coefficients are small. Its $D_{rmse}$ is 7% in Table 1.

Kolmogorov-Smirnov goodness-of-fit hypothesis tests (K-S tests) are used for the verification of derived marginal pdfs. Each K-S test is to compare the distributions of values in the two data sets, i.e. a set of data from simulation and a set of data generated from derived pdf. The null hypothesis for this test is that two sets of data are drawn from the same continuous distribution. The result of a K-S test is to reject the hypothesis if the distributions are different. With significance level $\alpha = 0.05$, among 256 dimensions, over 95% of K-S tests show that actual data and the data generated from the derived marginal pdfs are drawn from the same pdf for both lumpy background and its DCT coefficients. Table 2 shows the percentage of terms that passed tests and the number of K-S tests that rejected hypothesis for lumpy background and their DCT coefficients. The K-S test results of WGN are shown for reference in Table 2. From verification tests, one can conclude that the derived marginal pdfs predict the pdfs of actual data for both lumpy background and their DCT coefficients.

Figure 9A:
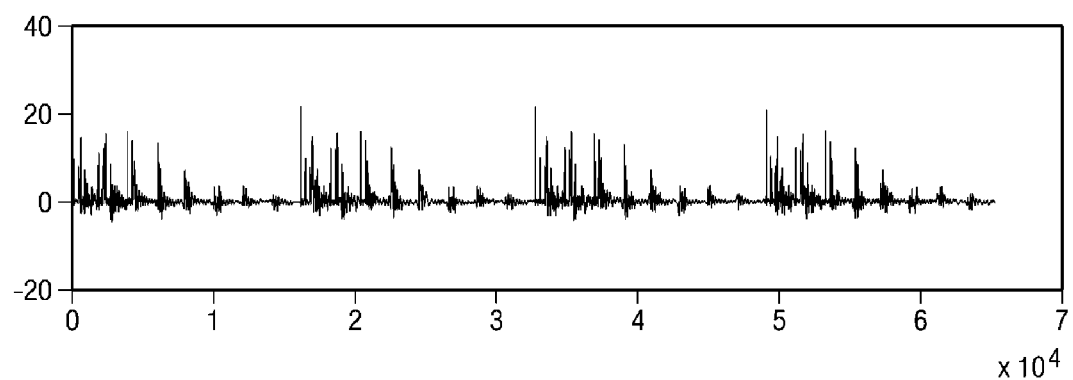
Figure 9B:
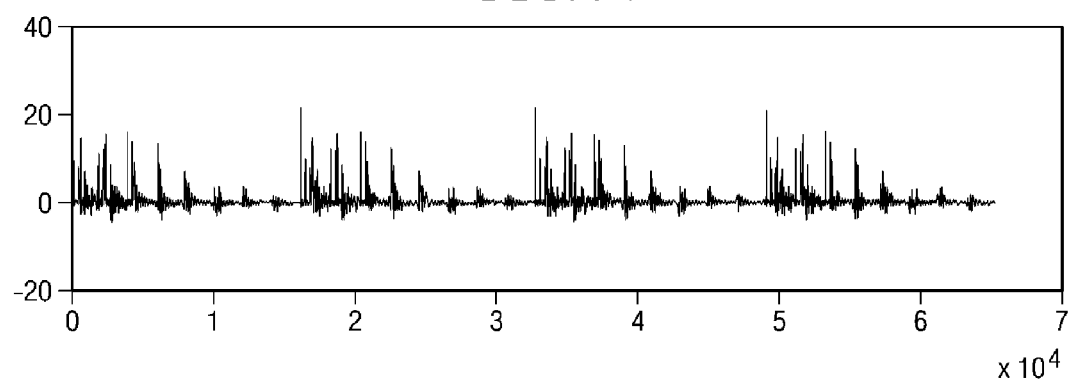
Figure 9C:
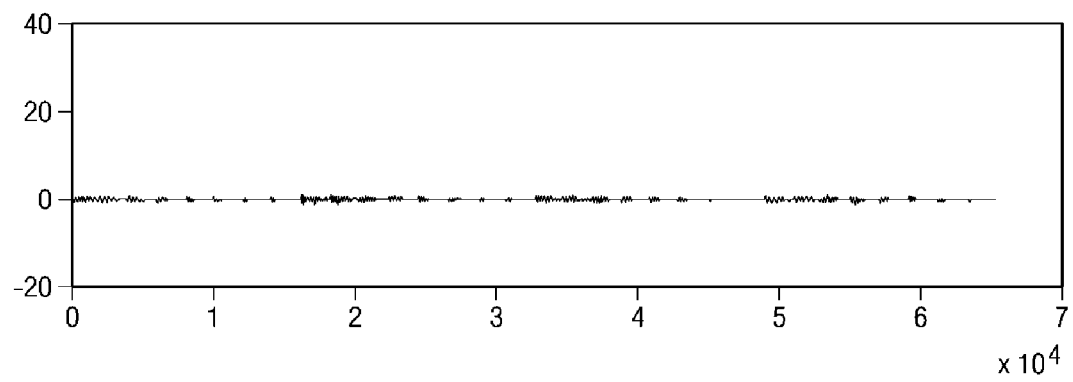

JPEG compression performs its quantization on DCT coefficients, and its quantization noise is the difference between DCT coefficients and quantized DCT coefficients, while the compression noise images are the difference between original images and reconstructed images. The compression noise may be shown as the inverse transform of quantization noise. The JPEG transform matrix is defined in Equations (64), (65) and (66). The sizes of quantization and compression noise images are 16×16 and the sizes of their covariance matrices are 256×256. The covariance matrices of quantization noise and compression noise are in Equation (71) and (77) respectively. FIG. 6 is the covariance matrices of quantization noise. FIG. 6A and FIG. 6B are the estimated and derived covariance matrices respectively. FIG. 6C is the difference between FIG. 6A and FIG. 6B. FIG. 6C shows that the differences between derived and estimated covariance matrices of quantization noise are small among all the elements comparing with the actual values in the matrix. Its numerical difference measures $D_{rmse}$ is 15.47% in Table 1. FIG. 9 shows the covariance matrices of compression noise. FIG. 9A and FIG. 9B are the estimated and derived covariance matrices of compression noise respectively. FIG. 9C is the difference of above matrices (FIG. 9A and FIG. 9B). All the differences in FIG. 9C is small comparing with its actual values in the matrix. Table 1 shows its numerical difference measures $D_{rmse}$ is 15.47%.

Figure 7A:
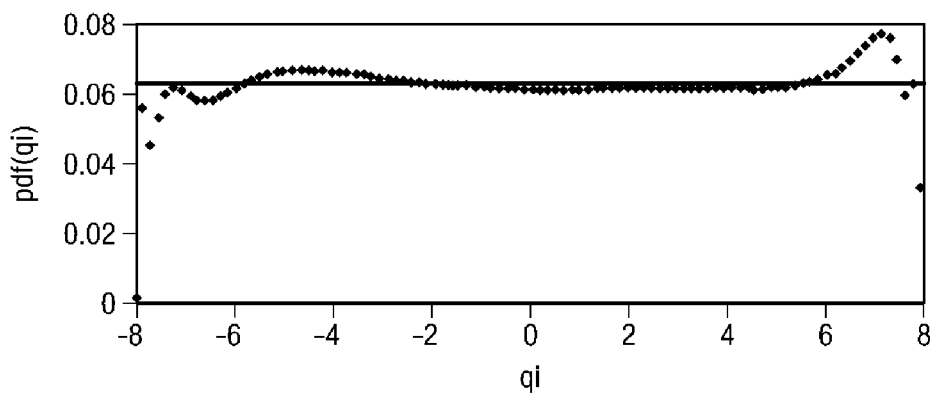
Figure 7B:
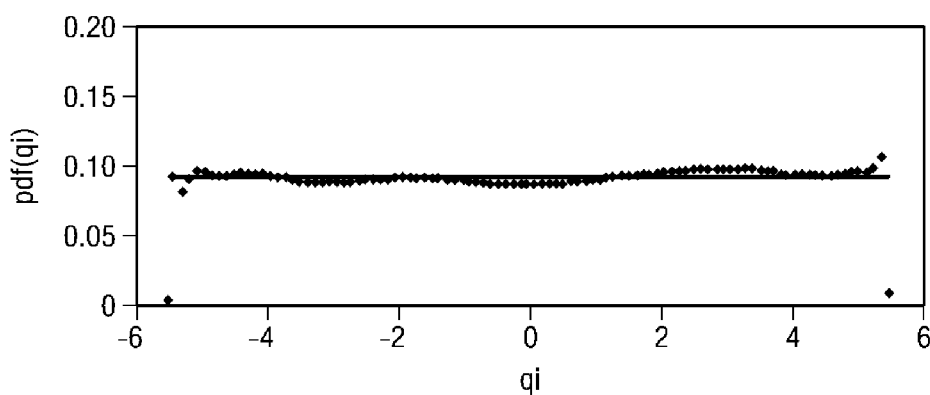
Figure 7C:
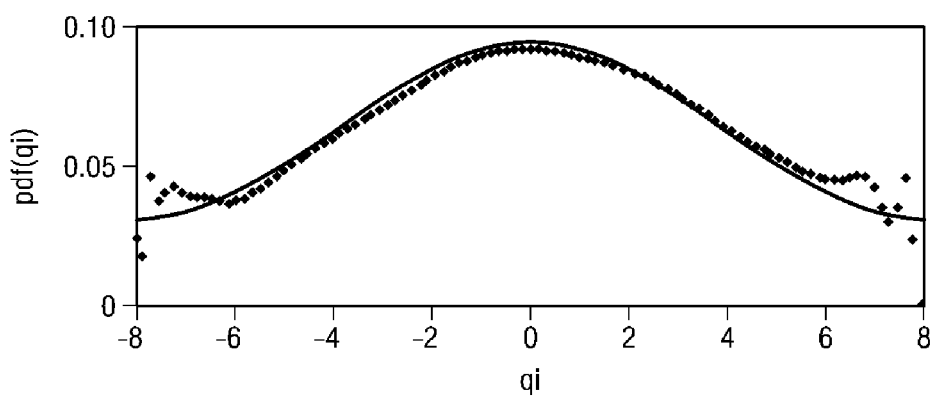
Figure 7D:
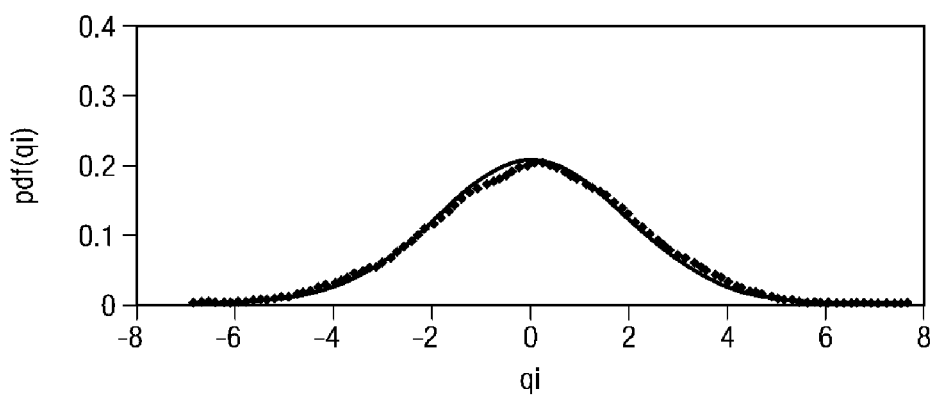
Figure 8A:
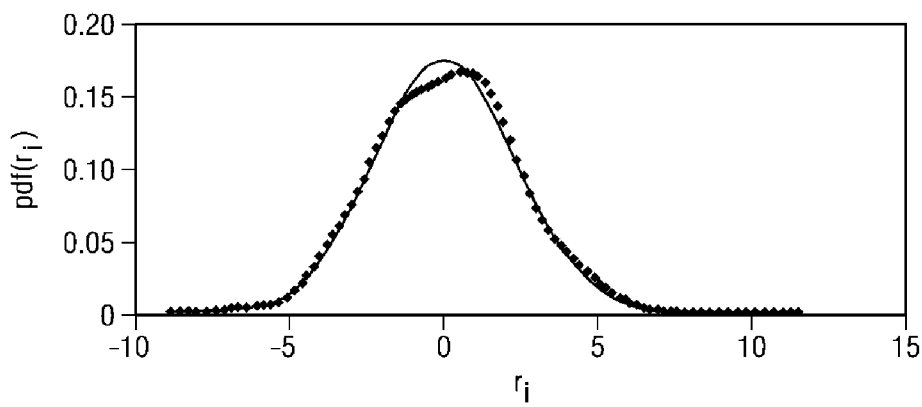
Figure 8B:
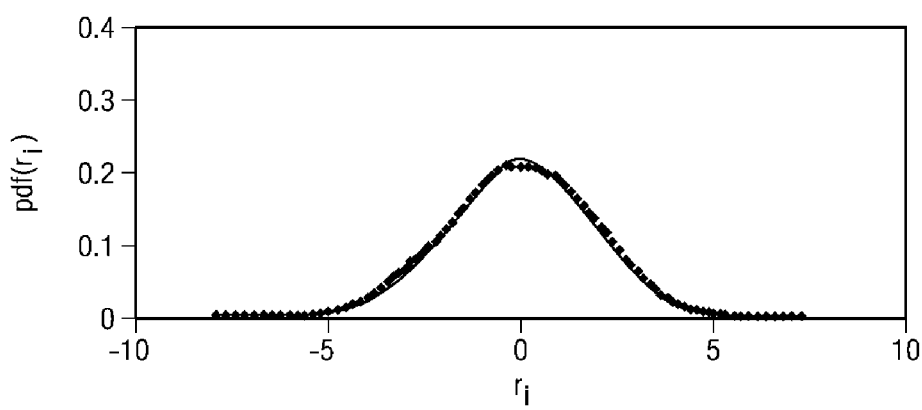
Figure 8C:
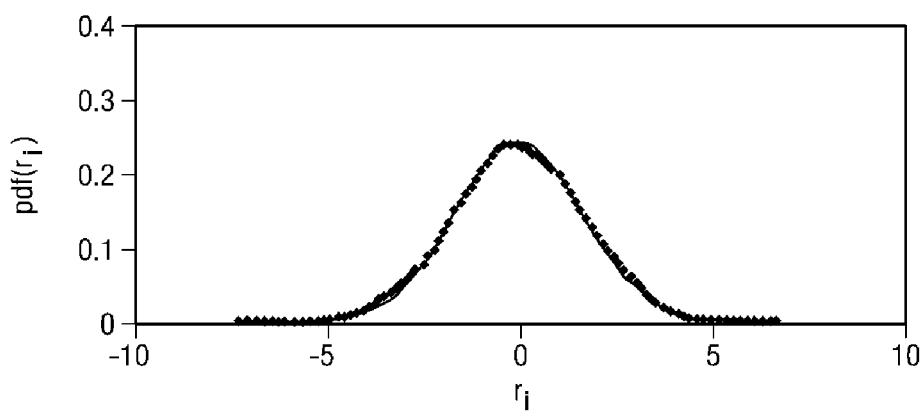
Figure 8D:
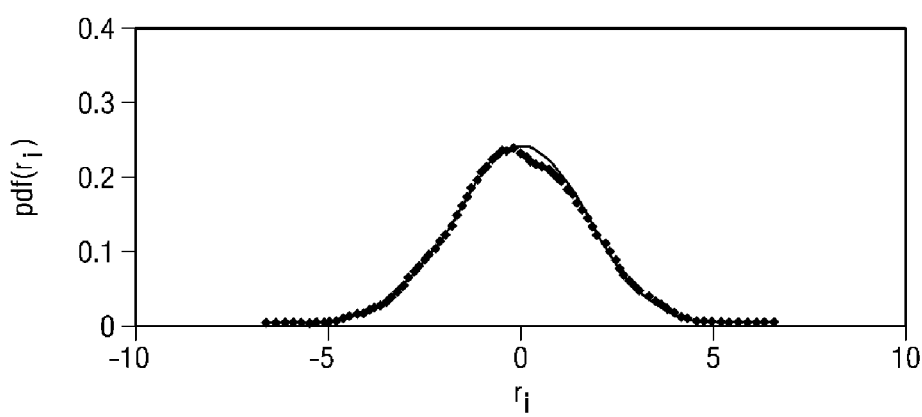

The derived marginal pdfs of quantization noise are in Equation (68). Since it is difficult to generate random samples based on the derived quantization noise pdfs in simulation, A kernel smoothing method is used to estimate probability density on each dimension of quantization noise samples. To compare the estimated pdfs with derived ones, the values of derived and estimated pdfs at same positions are calculated. FIG. 7 shows 4 marginal pdfs of quantization noise components while there are 256 components in total. The solid lines are from derived pdfs while the dot lines are from estimated pdfs. The quantization noise pdfs in FIGS. 7C and 7D show that quantization noise does not always distribute uniformly in general. From FIG. 6 one can conclude that the derived marginal pdfs predict the actual quantization noise pdfs very well. The mean of relative root mean square error between derived and estimated pdfs values is 6% and its standard deviation is 0.0352 over 256 dimensions.

The simplified marginal pdfs of compression noise, i.e. Equation (75), is used in the compression noise verification tests.

FIG. 8 shows marginal pdfs of compression noise for 4 pixels while there are 256 pixels in total. Solid lines are the derived pdfs while the dot lines are the estimated pdfs.

FIG. 8 shows the derived pdfs closely predict the actual pdfs, and the compression noise distributed normally as individual components.

Embodiments of the invention provide analytical-form statistics of quantization and compression noise of transform coding. The derived statistics include mean vectors and covariance matrices, the marginal pdfs, pair-wise pdfs and joint pdfs of quantization and compression noise. The statistics are verified by corresponding estimated statistics using JPEG compression algorithm and lumpy background original images. The verification tests show that the derived statistics closely predict actually statistics in simulation. The analytical-form statistics of compression noise provides a fundamental understanding of the compression distortion in transform coding. It can be used in compressed image quality assessment, compression algorithm optimization, block artifact reduction, and other compression related applications. For instance, the knowledge of compression noise statistics provides the foundation in deriving analytical-form model observers. The performance of model observers has been important image quality measure in medical applications. Such analytical-form image quality measures allow the user to choose compression parameters that will guarantee both compression ratio and the preservation of diagnostic information. It also provides a way to optimize compression algorithms subject to a model observer performance constraint such as ROC area.

TABLE 1

Relative RMSE $D_{rmse}$ between Derived and Estimated Covariance Matrixes

| White Gaussian Noise | | Lumpy Background (2048) | DCT representations (2048) | Quantization Noise (2048) | Compression Noise (2048) |
|---|---|---|---|---|---|
| 2048 Images | 20480 Images | | | | |
| 33.40% | 11.7% | 7.32% | 7.32% | 15.47% | 15.47% |

TABLE 2

K-S goodness-of-fit Hypothesis Test Results

| | White Gaussian Noise | Lumpy Background | DCT representations | Compression Noise |
|---|---|---|---|---|
| % of tests to accept the hypothesis | 93.75 | 93.75 | 93.75 | 93.75 |
| # of tests to reject hypothesis | 16 | 11 | 11 | 12 |

DaVinci™ technology may provide devices to use the above algorithms. DaVinci is a trademark of Texas Instruments Incorporated. DaVinci™ processors consist of scalable, programmable processors, including Digital Signal Processing (DSP)-based digital media processors, Advanced RISC Machine (ARM) processors and DSP-based systems-on-chips (SoCs), which include accelerators and peripherals.

Specifically, the processor families TMS320DM644x and TMS320DM643x available from Texas Instruments (Dallas, Tex.) and the like may be used. The TMS320DM644x architecture is a highly integrated system-on-chip (SoC) that has absorbed many of the external components required for digital video. The DM644x devices are based on Texas Instruments TMS320C64x+DSP core, an ARM926 processor, video accelerators, networking peripherals and external memory/storage interfaces. The TMS320DM6443 processor, tuned for video decode applications, provides all of the processing components required to decode digital video, including both analog and digital video output with integrated resizer and On-Screen Display (OSD) engines. The TMS320DM6446 processor, tuned for video encode and decode applications, adds video encoding capabilities through a dedicated video processing front end capable of capturing various digital video formats.

FIG. 10 is a functional block diagram of TMS320DM6443 Digital Media System-on-chip (SOC).

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation.

What is claimed is:

1. Circuitry for processing images and/or video of analytical-form objects with known statistics, said circuitry comprising:
   a processor that executes software instructions for processing the images and/or video;
   tiling circuitry that converts the images and/or video into non-overlapping blocks;
   a random access memory that stores the non-overlapping blocks as processed image and/or video data;
   a rotationally symmetric Gaussian low-pass filter; and
   transform coding hardware coupled to said random access memory and the processor that performs transform coding functions, responsive to a request by the processor, including
      producing lumpy background images using the rotationally symmetric Gaussian low-pass filter to filter in the frequency domain white Gaussian noise in the processed image and/or video data stored in the random access memory and
      returning the lumpy background images to the processor for further processing of the images and/or video,
   wherein the producing and returning of lumpy background images by the transform coding hardware comprises:
      generating a plurality of uncorrelated Gaussian images having a zero mean;
         calculating a 2D-Fast Fourier Transform (FFT) of the generated plurality of uncorrelated Gaussian images to get a plurality of Fourier coefficients;
         multiplying the plurality of Fourier coefficients by a set of low-pass filter coefficients pixel by pixel;
         calculating a 2D-Inverse Fast Fourier Transform (IFFT) of the multiplied filtered Fourier coefficients; and
         returning the real parts of the 2D-IFFT as lumpy background images to the processor for further processing.

2. The circuitry of claim 1, wherein
the further processing of the images and/or video includes
   calculating a block-based transform on each non-overlapping block,
   calculating quantization noise statistics from the block-based transform of each non-overlapping block, and
   calculating compression noise statistics from the quantization noise statistics.

* * * * *